(12) United States Patent
Torjesen et al.

(10) Patent No.: US 12,187,445 B2
(45) Date of Patent: Jan. 7, 2025

(54) GUIDE SYSTEMS FOR INSTALLING AIRCRAFT STRUCTURES

(71) Applicant: The Boeing Company, Chicago, IL (US)

(72) Inventors: Luke D. Torjesen, Brier, WA (US); Reed Daniel Wilson, Tukwilla, WA (US); August W. McKenna, Everett, WA (US); James R. Schnelz, Seattle, WA (US); Peter Albert Madakson, Seattle, WA (US); Richard Eugene Noble, Bothell, WA (US); Scott Thomas Olson, Kenmore, WA (US); Daniel W. Stewart, Renton, WA (US); Raymond Helgeson, Kirkland, WA (US); Frederick Zimmer, Seattle, WA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/707,647

(22) Filed: Mar. 29, 2022

(65) Prior Publication Data

US 2022/0315234 A1    Oct. 6, 2022

Related U.S. Application Data

(60) Provisional application No. 63/168,812, filed on Mar. 31, 2021.

(51) Int. Cl.
*B64D 29/06* (2006.01)
*B64D 29/08* (2006.01)
(Continued)

(52) U.S. Cl.
CPC ............. *B64D 29/06* (2013.01); *B64D 29/08* (2013.01); *F02K 1/70* (2013.01); *F02K 1/80* (2013.01);
(Continued)

(58) Field of Classification Search
CPC .. F02K 1/80; F02K 1/70; B64D 29/06; B64D 29/08; F01D 25/285
See application file for complete search history.

(56) References Cited

U.S. PATENT DOCUMENTS 2,564,530 A * 8/1951 Guery .................... B64D 29/06
123/41.7
5,203,525 A * 4/1993 Remlaoui .............. B64D 29/06
244/129.4

(Continued)

FOREIGN PATENT DOCUMENTS

EP    2399827 A2    12/2011
EP    3696095 A1     8/2020

(Continued)

OTHER PUBLICATIONS

European Patent Office, "Extended European Search Report," issued in connection with European Patent Application No. 22157732.3 on Aug. 5, 2022, 7 pages.

(Continued)

*Primary Examiner* — Andrew H Nguyen
(74) *Attorney, Agent, or Firm* — Hanley, Flight & Zimmerman, LLC

(57) ABSTRACT

Guide systems for installing aircraft structures are disclosed. An example apparatus includes a first guide structured to be supported by a first hinge component of a first aircraft structure and a second guide structured to be supported by a second hinge component of a second aircraft structure. The first guide is to receive the second guide when the second (Continued)

structure is at an installation angle relative to the first structure. Engagement between the first guide and the second guide to enable rotational movement of the first hinge component and the second hinge component when the second aircraft structure moves to an installed position.

20 Claims, 34 Drawing Sheets

(51) Int. Cl.
  *F02K 1/70* (2006.01)
  *F02K 1/80* (2006.01)
(52) U.S. Cl.
  CPC .... *F05D 2220/323* (2013.01); *F05D 2230/72* (2013.01)

(56) References Cited

U.S. PATENT DOCUMENTS

| | | | |
|---|---|---|---|
| 6,189,832 B1* | 2/2001 | Jackson | B64C 7/02 244/129.4 |
| 6,604,355 B1 | 8/2003 | Sternberger | |
| 2004/0118970 A1 | 6/2004 | Muylaert et al. | |
| 2007/0226981 A1 | 10/2007 | Craig | |
| 2011/0318173 A1 | 12/2011 | Ramlaoui | |
| 2012/0151724 A1* | 6/2012 | Defrance | E05C 19/145 24/601.5 |
| 2013/0220435 A1* | 8/2013 | James | B64D 29/08 137/15.1 |
| 2015/0044011 A1* | 2/2015 | Matulewicz | B66D 1/60 414/800 |
| 2016/0167789 A1 | 6/2016 | Knight et al. | |
| 2016/0167808 A1 | 6/2016 | Iliopoulos | |
| 2016/0363323 A1* | 12/2016 | Mogle | F23R 3/60 |
| 2016/0376015 A1 | 12/2016 | Lacko | |
| 2018/0163631 A1 | 6/2018 | Takeuchi | |
| 2018/0346138 A1 | 12/2018 | Ridray et al. | |
| 2018/0362172 A1 | 12/2018 | Paolini et al. | |
| 2018/0362174 A1 | 12/2018 | Paolini et al. | |
| 2019/0284856 A1 | 9/2019 | Geliot et al. | |
| 2019/0359342 A1* | 11/2019 | Cooper | F02C 7/20 |
| 2020/0079516 A1* | 3/2020 | Gaches | B64D 29/06 |
| 2020/0140105 A1 | 5/2020 | Pretty et al. | |
| 2020/0182194 A1 | 6/2020 | Journade et al. | |
| 2020/0325797 A1 | 10/2020 | Wright et al. | |
| 2021/0079871 A1* | 3/2021 | Grall | F02K 1/80 |
| 2021/0222648 A1 | 7/2021 | Cazeaux | |
| 2021/0310441 A1 | 10/2021 | Palanisamy | |
| 2021/0316872 A1 | 10/2021 | Lacko | |
| 2022/0073215 A1* | 3/2022 | Le Gall | F01D 25/285 |
| 2022/0315234 A1 | 10/2022 | Torjesen et al. | |
| 2023/0255803 A1 | 8/2023 | Kuniholm et al. | |
| 2023/0286661 A1 | 9/2023 | Klingels | |

FOREIGN PATENT DOCUMENTS

| | | |
|---|---|---|
| EP | 3798133 A1 | 3/2021 |
| EP | 3805108 A1 | 4/2021 |
| FR | 3064980 A1 | 10/2018 |
| WO | 2007109200 A2 | 9/2007 |
| WO | 2015015262 A1 | 2/2015 |
| WO | 2019129961 A1 | 7/2019 |
| WO | 2022028653 A1 | 2/2022 |

OTHER PUBLICATIONS

United States Patent and Trademark Office, "Requirement for Restriction / Election," issued in connection with U.S. Appl. No. 17/709,050, dated Sep. 20, 2023, 6 Pages.

United States Patent and Trademark Office, "Non-Final Office Action," issued in connection with U.S. Appl. No. 17/709,050, dated Nov. 9, 2023, 6 Pages.

United States Patent and Trademark Office, "Final Office Action," issued in connection with U.S. Appl. No. 17/709,050, dated Apr. 19, 2024, 5 pages.

United States Patent and Trademark Office, "Notice of Allowance and Fee(s) Due," issued in connection with U.S. Appl. No. 17/709,050, dated Jul. 11, 2024, 6 pages.

* cited by examiner

GUIDE SYSTEMS FOR INSTALLING AIRCRAFT STRUCTURES

RELATED APPLICATIONS

This patent claims the benefit of U.S. Provisional Patent Application No. 63/168,812, which was filed on Mar. 31, 2021. U.S. Provisional Patent Application No. 63/168,812 is hereby incorporated herein by reference in its entirety. Priority to U.S. Provisional Patent Application No. 63/168,812 is hereby claimed

FIELD

The present disclosure relates generally to aircraft and, more particularly, to guides for installing aircraft structures.

BACKGROUND

Aircraft engines often employ reverse thruster systems to produce a reverse thrust to help decelerate the aircraft upon landing (e.g., after touchdown), thereby reducing brake wear and enabling shorter landing distances.

SUMMARY

An example apparatus includes a first guide structured to be supported by a first hinge component of a first aircraft structure and a second guide structured to be supported by a second hinge component of a second aircraft structure. The first guide is to receive the second guide when the second structure is at an installation angle relative to the first structure. Engagement between the first guide and the second guide to enable rotational movement of the first hinge component and the second hinge component when the second aircraft structure moves to an installed position.

Another apparatus includes a pylon, a first hinge component formed by the pylon and a hook provided on the first hinge component. The apparatus includes a thrust reverser, a second hinge component formed on the thrust reverser, and a pin provided on the second hinge component.

An example method includes coupling a first guide to a first hinge component of a first aircraft structure; removably coupling a second guide to a second hinge component of a second aircraft structure; coupling the second guide and the first guide when the second aircraft structure is positioned in an installation angle relative to the first aircraft structure; and rotating the second aircraft structure to an installed position.

Figure 1:
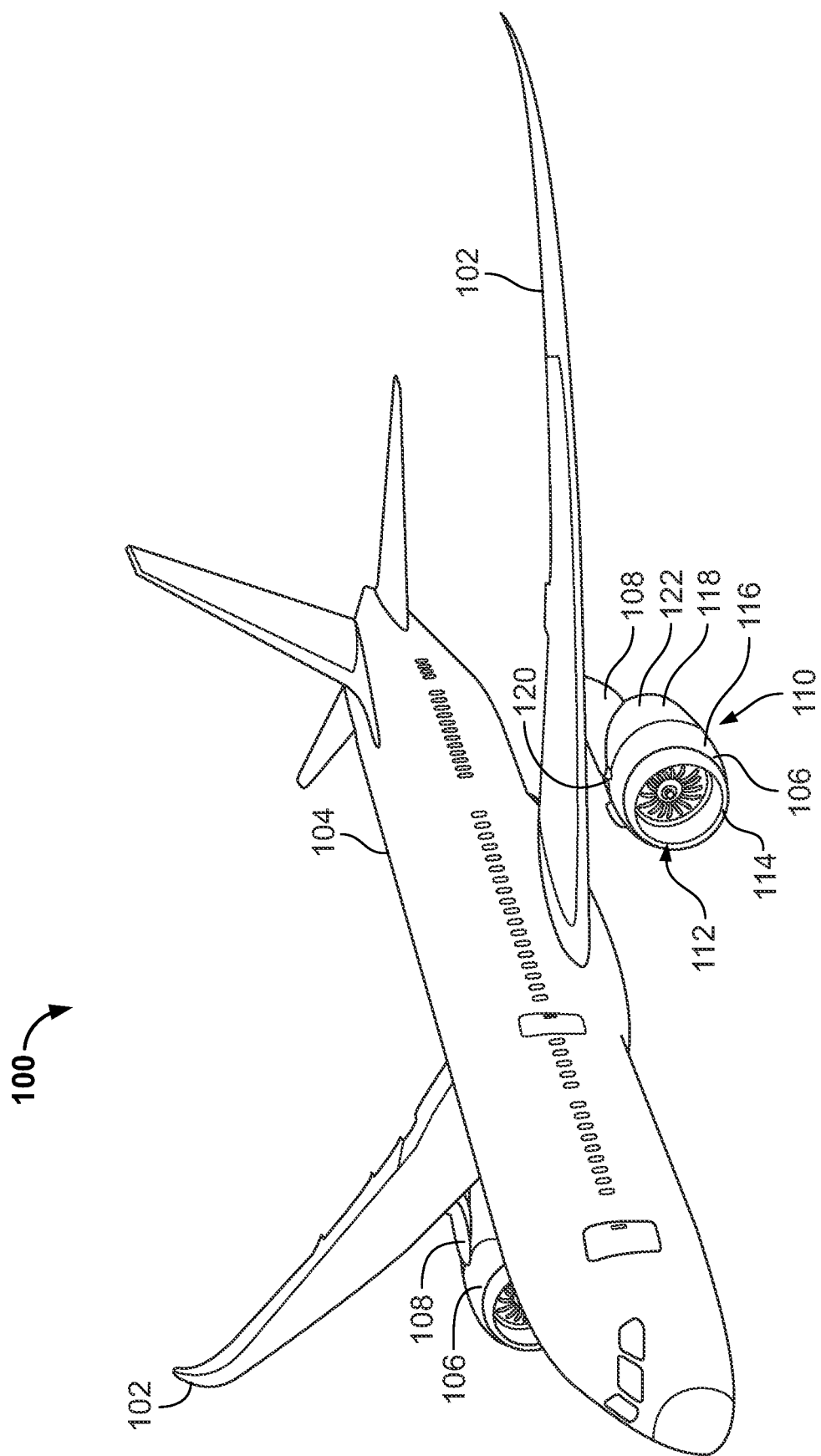
FIG. 1 is a perspective view of an example aircraft in which aspects of the present disclosure may be implemented.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Some turbofan engines employ reverse thrust mechanisms to decelerate an aircraft upon landing. The reverse thrust produced reduces the forward thrust produced by the turbofan engine and, thus, reduces the speed of the aircraft. For example, reverse thrust is produced by redirecting airflow within the engine that would otherwise produce forward thrust. Thrust reversers typically include a clamshell profile. For example, the thrust reversers include a first thrust reverser portion or section and a second thrust reverser portion or section that surround an engine core when an aircraft engine is assembled. Typically, the thrust reverser portions attach to a pylon structure of an aircraft via a hinge pin connection.

Thrust reverser installation can be ergonomically challenging and require safety protocols. For example, to couple the thrust reverser sections to the pylon, the thrust reverser sections are positioned relative to the pylon via a lift system (e.g., a crane, a ground lift, etc.). The thrust reverser sections are maneuvered and/or guided relative to the pylon to align hinge apertures of the pylon and thrust reverser sections via a crane (e.g., an overhead crane). With the hinge apertures positioned in alignment, personnel or technicians climb on top of the aircraft engine using fall protection safety equipment to install the hinge pins while laying across the top of the aircraft engine and while the thrust reverser section is supported by the crane. This assembly technique is not ergonomic. For example, a technician typically lays across a top of the aircraft engine and extends their hand in an area that has limited access to install the hinge pins. Additionally, the thrust reverser load is supported by the crane, which can shift or sway during assembly and increase manufacturing complexity.

Example guide systems and/or hinge structures disclosed herein facilitate installation of thrust reversers. Specifically, the guide systems disclosed herein are ergonomic. For example, the guide systems and/or hinge structures disclosed herein enable a first structure or thrust reverser to be securely attached to a second structure or pylon without the need for a technician to climb on and/or lay across the aircraft engine. Additionally, the guide systems and/or hinge structures disclosed herein remove dependency on a crane to support a load of the thrust reverser when installing hinge pins. The load of the thrust reverser is supported by the pylon via the guide system, thereby eliminating potential for shifting or swaying during installation of the hinge pins. For example, the guide systems and/or hinge structures disclosed herein employ a first guide (e.g., a hook or retaining feature) on an interfacing pylon hinge that can safely support the weight of the thrust reverser and orient the thrust reverser in a manner that enables installation of the thrust reverser/pylon hinge pins after the crane is removed. For example, an example connection between a first guide and a second guide disclosed herein prevent lateral movement of a first hinge component of a first aircraft structure or pylon relative to a second hinge component of a second aircraft structure or thrust reverser portion when the second aircraft structure moves from the installation position to an installed position (e.g., prior to attachment of a main hinge pin). As a result, the guide systems and/or hinge structures disclosed herein greatly improve manufacturability. Thus, the example guide systems and/or hinge structures disclosed herein reduce manufacturing complexity and/or improve manufacturing efficiency. The guide systems and/or hinge structures (e.g., a hook feature) disclosed herein can be an integral fly-away feature of a hinge, or a removable ground-support feature of a hinge. Example guide systems and/or hinges disclosed herein employ hooks or hook-like features.

The example guide systems disclosed herein can be employed to couple or attached a first aircraft structure and a second aircraft structure. For example, a first aircraft structure can include a pylon, an aircraft frame structure, a wingbox and/or any other aircraft structure. A second aircraft structure can include a thrust reverser portion, a fan cowl, and/or any other portions of a nacelle and/or any other aircraft structure. Although examples described below are directed to a first aircraft structure as a pylon and a second aircraft structure as a thrust reverser portion, the example guide systems disclosed herein can be employed to attach a fan cowl to a pylon. In some examples, example guide systems disclosed herein can be employed to any other first aircraft structure and a second aircraft structure of an aircraft forming a hinged connection. In some examples, the guide systems disclosed herein can be employed with other vehicles, marine vehicles, frame structures, machines, equipment, buildings, etc., For example, the guide systems disclosed herein can be employed to facilitate and/or enable coupling of two or more structures that couple together via a hinged connection.

FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is a turbofan engine that can embody aspects of the teachings of this disclosure. The aircraft engine 106 of FIG. 1 includes a nacelle 110 that houses an engine core 112 and provides an aerodynamic outer surface to reduce drag. The nacelle 110 includes an inlet cowl 114 (e.g., an outer panel), a fan cowl 116 (e.g., a clam-shell cowl), and a thrust reverser 118. The fan cowl 116 and the thrust reverser 118 encompass or surround the engine core 112. The thrust reverser 118 of the illustrated example forms or defines a portion of an outer surface of the nacelle 110. The thrust reverser 118 of the illustrated example includes a first thrust reverser portion 120 (e.g., a right-hand thrust reverser wall or first half) and a second thrust reverser portion 122 (e.g., a left-hand thrust reverser wall or second half). As described in greater detail below, the thrust reverser 118 is coupled to the pylon 108 in accordance with the teachings disclosed herein. Additionally, the thrust reverser 118 is movably coupled (e.g. pivotally coupled) to the pylon 108 to allow access to the engine core 112 during maintenance. Although the aircraft 100 of FIG. 1 is a commercial aircraft (e.g., a commercial airliner), the examples disclosed herein can be employed with military aircraft, marine vehicles, all-terrain vehicles, etc.

Figure 2:
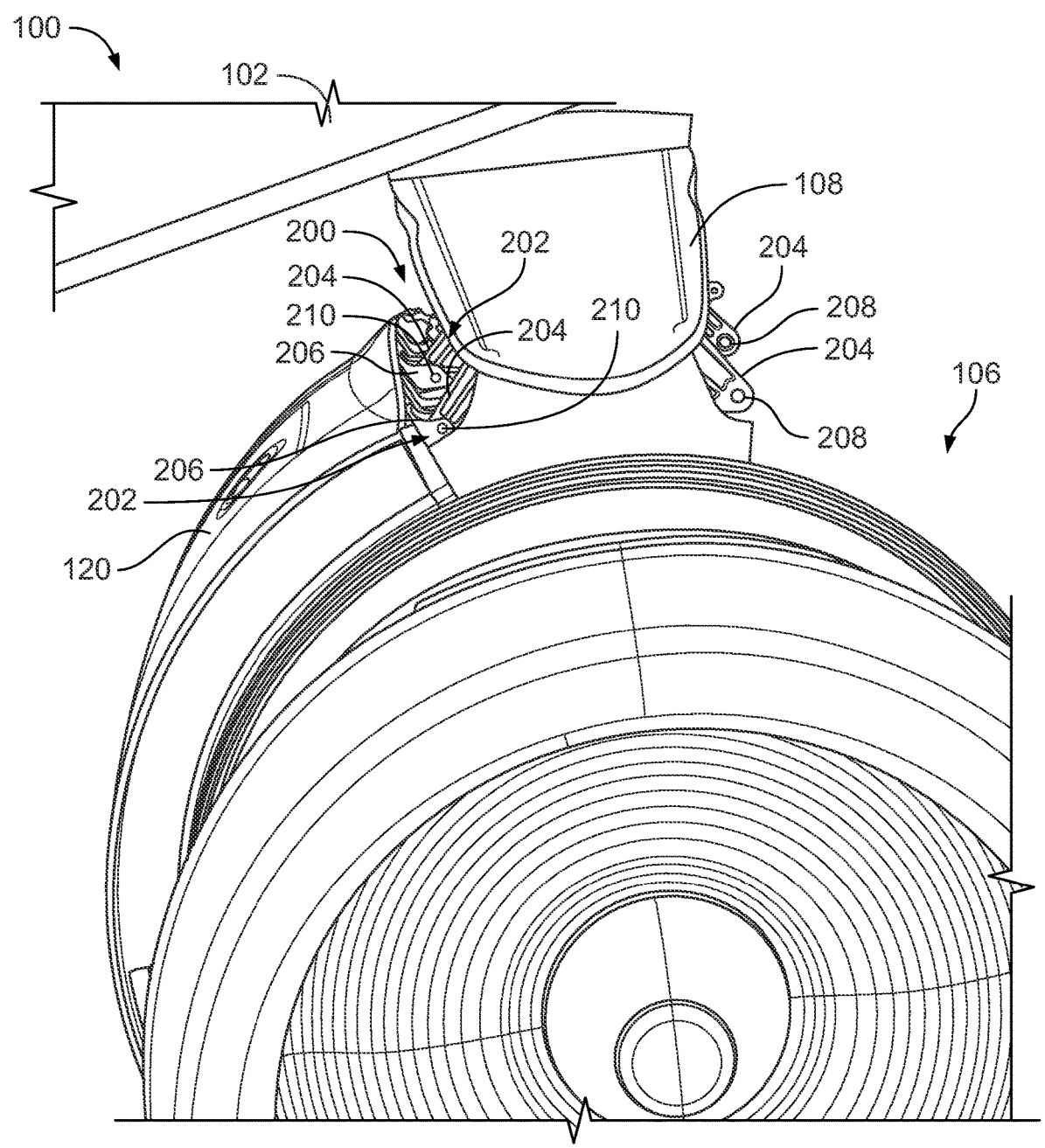
FIG. 2 is a front, partial perspective view of an example aircraft engine of the example aircraft of FIG. 1. Components of the example aircraft engine are removed to expose an example hinge joint between an example thrust reverser portion and an example pylon of the example aircraft engine.

FIG. 2 is a partial, perspective view of the aircraft 100 of FIG. 1. The aircraft engine 106 of FIG. 2 is shown with exterior components removed such as, for example, the second thrust reverser portion 122 (FIG. 1), the fan cowl 116 (FIG. 1), and other portions of the nacelle 110 (FIG. 1), to show substructure of the aircraft engine 106. As noted in FIG. 1, the aircraft engine 106 (e.g., the engine core 112, the nacelle 110, the thrust reverser 118, the fan cowl 116, etc.) is coupled to the wing 102 via the pylon 108. The first thrust reverser portion 120 is shown coupled to the pylon 108 in FIG. 2. The second thrust reverser portion 122 is removed for clarity. The second thrust reverser portion 122 is similar to (e.g., is a mirror image of) the first thrust reverser portion 120.

To couple the thrust reverser 118 to the pylon 108, the thrust reverser 118 and the pylon 108 forms a hinge 200 (e.g., a pinned lug-and-clevis connection). The hinge 200 of the illustrated example includes a plurality of hinge joints 202 (e.g., lug-and-clevis joints). For example, the pylon 108 includes a plurality of first hinge components 204 and the thrust reverser portion 120 includes a plurality of second hinge components 206. The first hinge components 204 receive or couple to respective ones of the second hinge components 206 to form the hinge joints 202. Each of the first hinge components 204 includes a hinge opening 208 and each of the second hinge components 206 includes a hinge opening 210. Each of the hinge joints 202 receives a hinge pin (e.g., a hinge pin 1500 of FIG. 15). The pins are omitted from FIG. 2 for clarity. In some example, the hinge joint 202 is a lug-and-clevis joint. To form the lug-and-clevis type hinge joints 202, the first hinge components 204 of the pylon 108 of the illustrated example are lugs and the second hinge components 206 of the thrust reverser portion 120 of the illustrated example are devises. In some examples, the thrust reverser portion 120 can include the lugs and the pylon 108 can include the clevis. In some examples, other structures can be employed to define the hinge joints 202 and/or the hinge 200.

Figure 3:
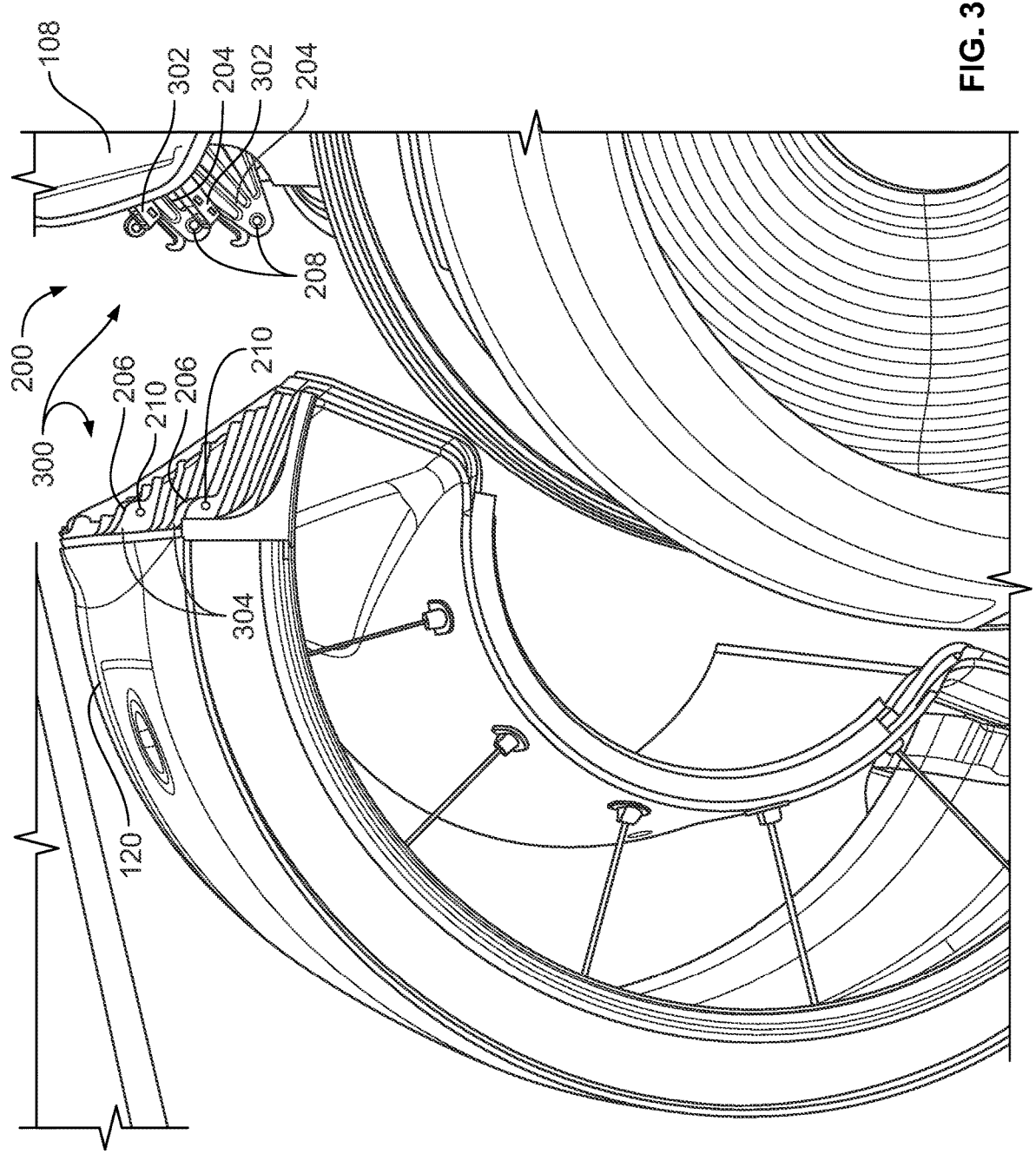
FIG. 3 is a partially exploded, perspective view of the example aircraft engine and the example thrust reverser portion of FIGS. 1 and 2 implemented with an example guide system constructed in accordance with the teachings of this disclosure.

FIG. 3 is a perspective view of the example aircraft engine 106 of FIGS. 1 and 2 shown in a partially exploded view and implemented with an example guide system 300 constructed in accordance with the teachings of this disclosure. Specifically, the thrust reverser portion 120 is decoupled from the pylon 108. The guide system 300 facilitates alignment between the thrust reverser 118 and the pylon 108. Specifically, the guide system 300 facilitates alignment between the hinge openings 208 (e.g., first hinge openings) of the first hinge components 204 and the hinge openings 210 (e.g., second hinge openings) of the second hinge components 206 when the thrust reverser portion 120 couples to the pylon 108. The guide system 300 of the illustrated example includes a first guide 302 (e.g., a first installation tool) and a second guide 304 (e.g., a second installation tool). The first guide 302 is removably coupled to the pylon 108 (e.g., a first aircraft structure), which includes or supports the first hinge components 204. The second guide 304 is removably coupled to the thrust reverser portion 120 (e.g., a second aircraft structure), which includes or supports the second hinge components 206. The first guide 302 interfaces with the second guide 304 to facilitate installation of the thrust reverser portion 120 and the pylon 108.

In operation, the first guide 302 is removably attached to the pylon 108 and the second guide 304 is removably attached to the thrust reverser portion 120. With the first guide 302 is coupled to the pylon 108 and the second guide 304 is coupled to the first thrust reverser portion 120, the first thrust reverser portion 120 interfaces with the first guide 302 (e.g., via a crane). Engagement between first guide 302 and the second guide 304 enables alignment between the first hinge components 204 and the second hinge components 206 when the thrust reverser portion 120 is moved from an installation position to an installed position. An interface provided between the first guide 302 and the second guide 304 enables the thrust reverser portion 120 to pivot relative to the pylon 108. Further, in some examples, the guide system 300 can be employed to couple the fan cowl 116 and the pylon 108. In some examples, the guide system 300 can be employed to couple any other aircraft structures that have a hinged connection.

Figure 4:
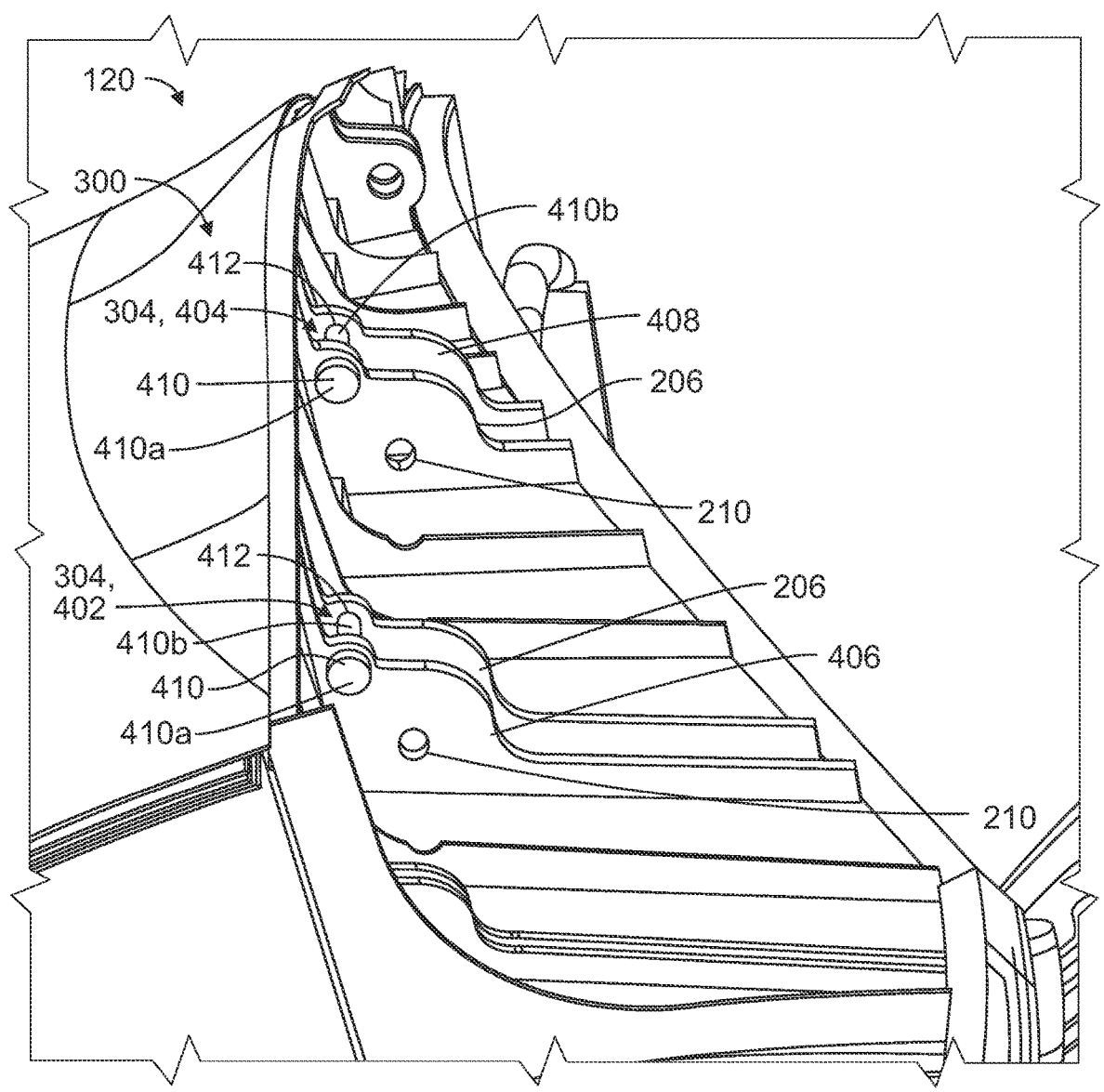
FIG. 4 is a perspective view of the example thrust reverser portion implemented with the example guide system of FIG. 3.

FIG. 4 is a perspective, partial view of the thrust reverser portion 120 implemented with the example guide system 300 of FIG. 3. The second guide 304 of the illustrated example includes a first thrust reverser (TR) connector 402 and a second thrust reverser (TR) connector 404. For example, the first TR connector 402 is coupled to a first one 406 of the second hinge components 206 and the second TR connector 404 is coupled to a second one 408 of the second hinge components 206. Each of the first TR connector 402 and the second TR connector 404 of the illustrated example is a support pin 410. The support pin 410 includes a head 410a and a body 410b. The second hinge components include support pin openings 412 (e.g., through holes, apertures, etc.) to receive the body 410b of the respective first TR connector 402 and the second TR connector 404. Thus, the second hinge components 206 of the illustrated example include the hinge openings 210 to receive hinge pins that couple the thrust reverser portion 120 and the pylon 108 and the support pin openings 412 to receive the second guide 304. In some examples, the second guide 304 is a unitary pin that couples to the first one 406 of the second hinge components 206 and the second one 408 of the second hinge components 206. The first TR connector 402 and the second TR connector 404 of the illustrated example are removably coupled to the thrust reverser portion 120. For example, the support pins 410 couple to the support pin openings 412 via a clearance fit. For example, the support pins 410 can be installed in the support pin openings 412 (e.g., without a tool) and retained via a retainer (e.g., a threaded nut, a retaining pin, etc.). After installation of the thrust reverser portion 120 and the pylon 108, the second guide 304 of the illustrated example is removed from the thrust reverser portion 120. In some examples, the first TR connector 402 and/or the second TR connector 404 is integrally formed with the second hinge components 206. In the illustrated example, the thrust reverser portion 120 includes two hinge components. In some examples, the thrust reverser portion 120 can include one hinge component, or more than two hinge components (e.g., three hinge components, four hinge components, etc.). In some such examples, each one of the second hinge components 206 can include the support pin 410. Additionally, the first TR connector 402 of the illustrated example is identical to the second TR connector 404. However, in some examples, the first TR connector 402 can be different than the second TR connector 404. For example, the first TR connector 402 can have a different size, diameter, shape or feature than the second TR connector 404.

Figure 5:
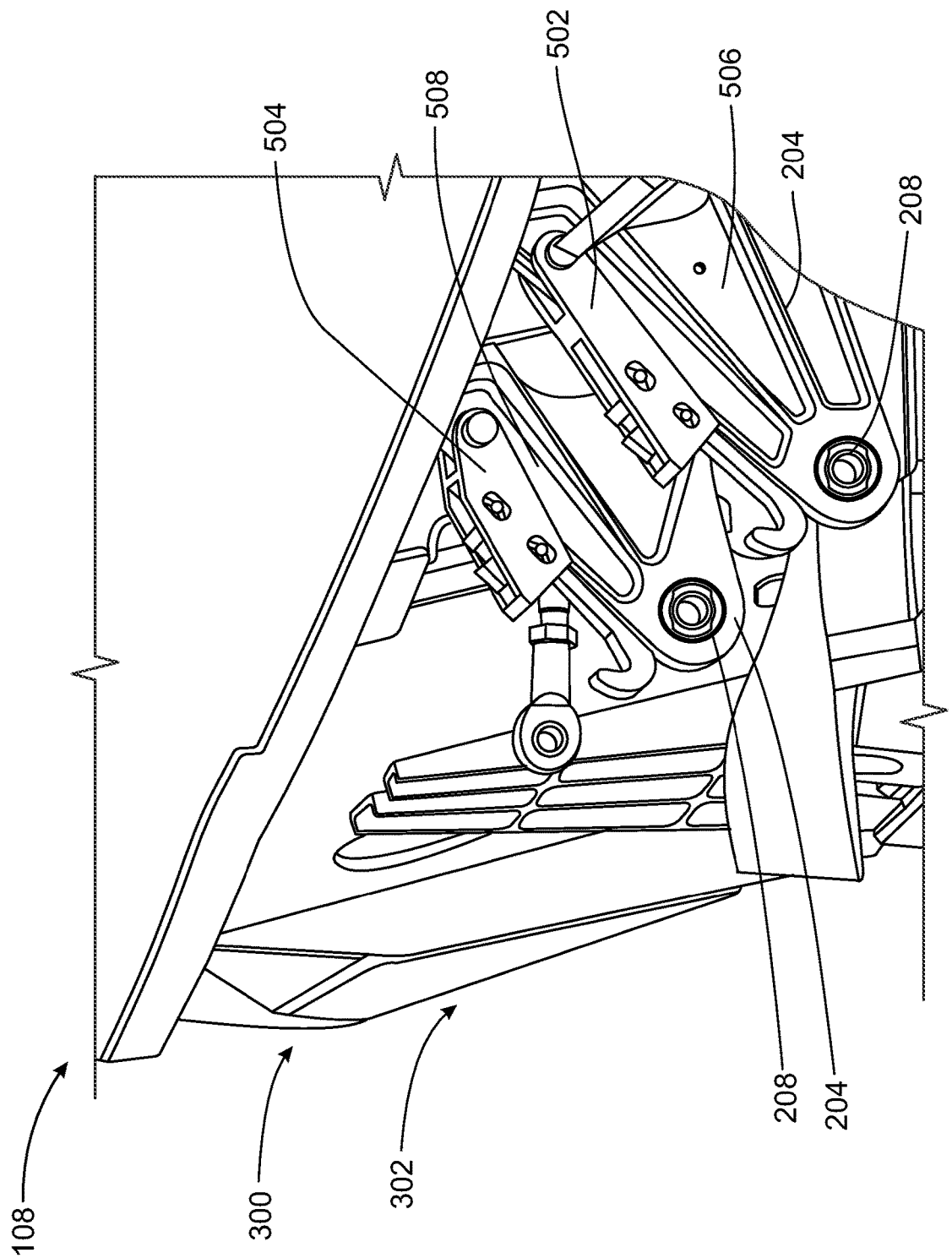
FIG. 5 is a perspective view of the example pylon implemented with the example guide system of FIG. 3.

FIG. 5 is a perspective, partial view of the pylon 108 implemented with the example guide system 300 of FIG. 3. The first guide 302 of the illustrated example includes a first pylon connector 502 and a second pylon connector 504. For example, the first pylon connector 502 is removably coupled to a first one 506 of the first hinge components 204 and the second pylon connector 504 is removably coupled to a second one 508 of the first hinge components 204. Each of the first pylon connector 502 and the second pylon connector 504 of the illustrated example is a support configured to interface with the first TR connector 402 and the second TR connector 404, respectively. After installation of the thrust reverser portion 120 and the pylon 108, the first guide 302 of the illustrated example is removed from the pylon 108. In some examples, the first pylon connector 502 and/or the second pylon connector 504 are integrally formed with the first hinge components 204. In the illustrated example, the pylon 108 includes two hinge components. In some examples, the pylon 108 can include one hinge component, or more than two hinge components (e.g., three hinge components, four hinge components, etc.). In some such examples, each one of the first hinge components 204 can include the support 510. The first pylon connector 502 of the illustrated example is structured different than the second pylon connector 504. However, the second pylon connector 504 can receive the same or similar guide system 300 disclosed herein. In some examples, the first pylon connector 502 is identical to the second pylon connector 504.

Figure 6A:
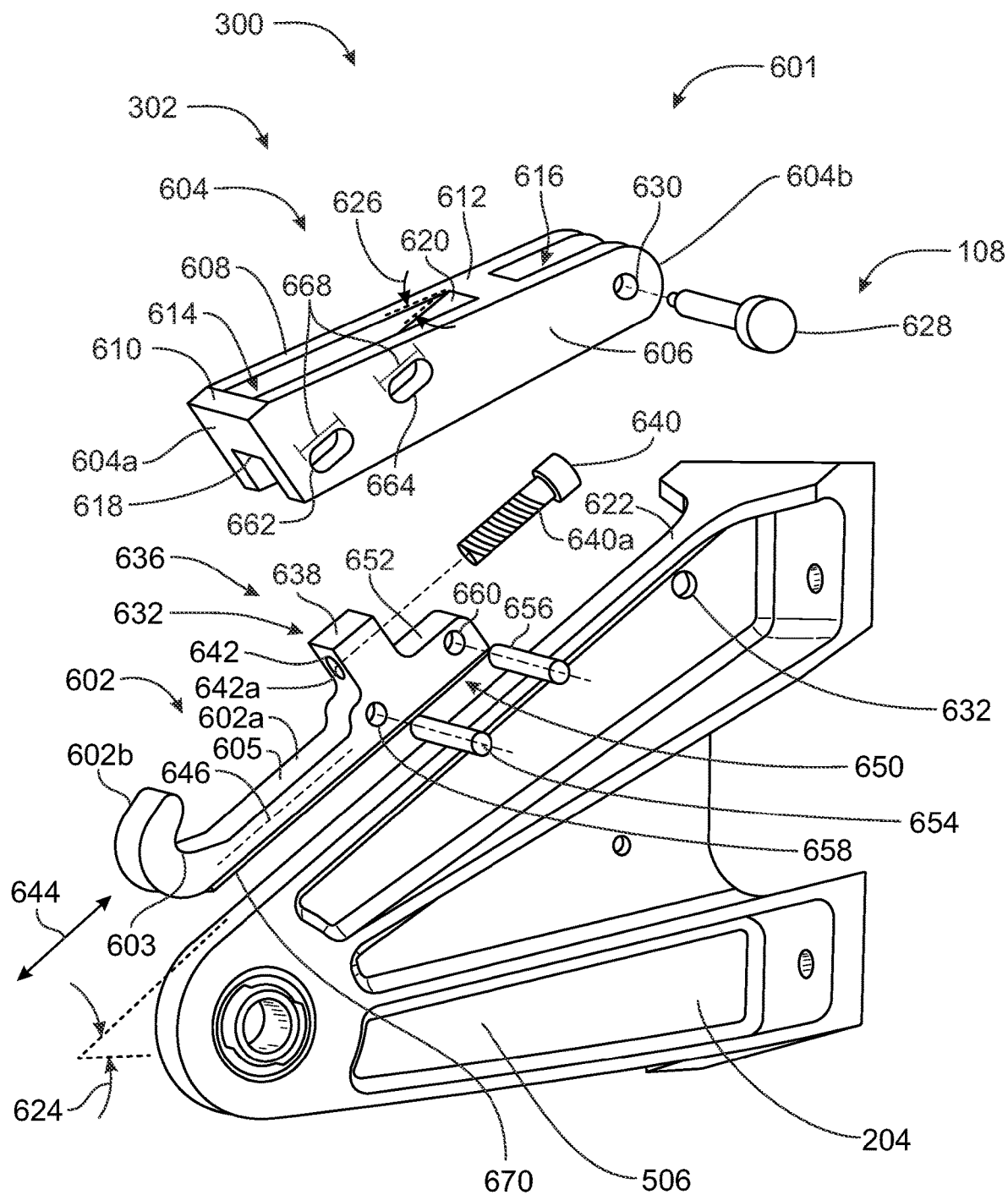
FIGS. 6A and 6B are perspective, exploded views of an example first guide of the example guide system of FIG. 3.
Figure 6B:
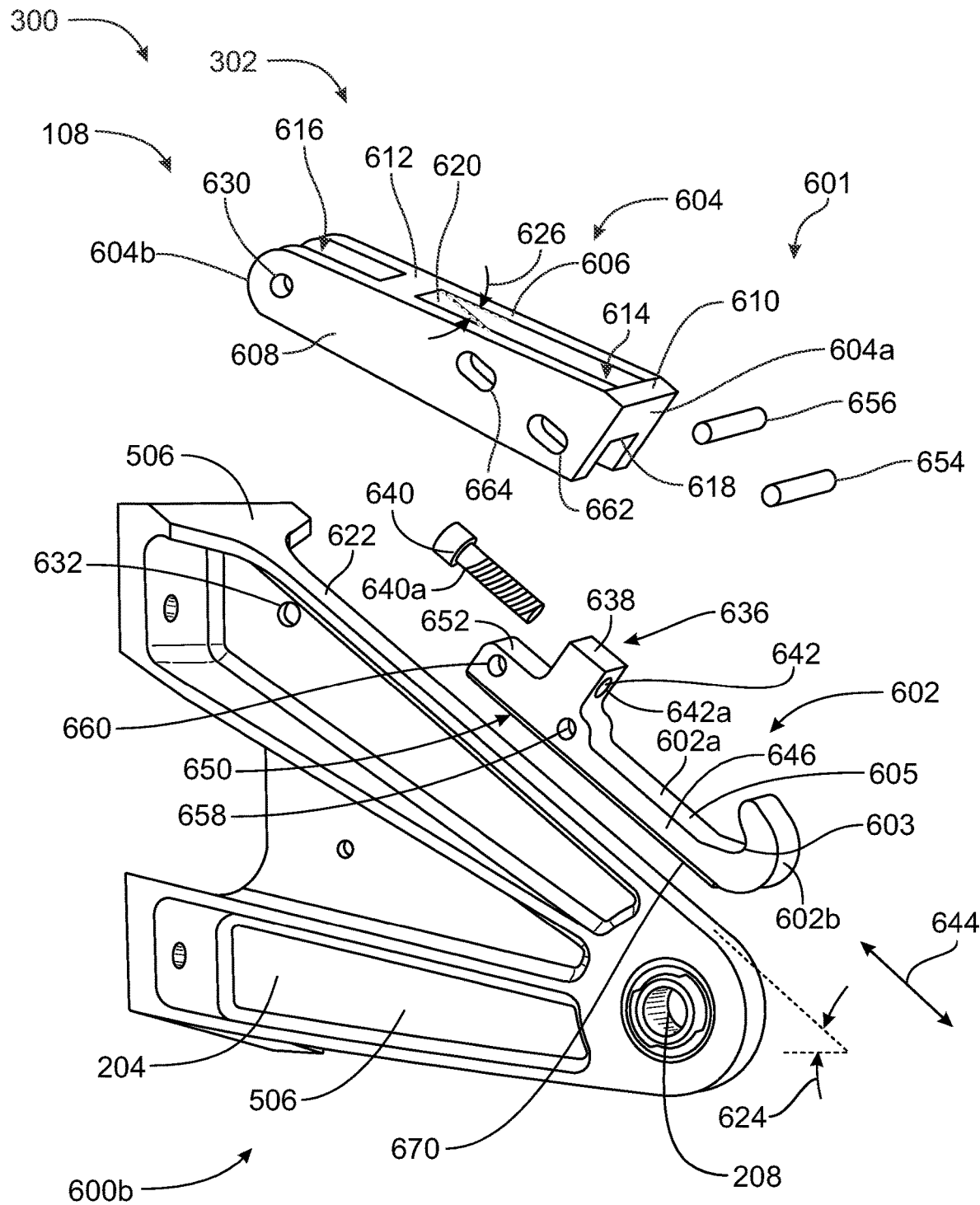

FIGS. 6A and 6B are perspective, exploded views of the first guide 302 disclosed herein. FIG. 6A a first side view 600a (e.g., from fore-to-aft) of the first guide 302 and FIG. 6B is a second side view 600b (e.g., from aft-to-fore) of the first guide 302 opposite the first side view 600a. The first guide 302 of the illustrated example includes a hook assembly 601 having a hook 602 (e.g., a retainer) and a base 604. The hook 602 of the illustrated example has a hook body 602a and a hook end 602b that projects from the hook body 602a. For example, the hook body 602a of the illustrated example is substantially straight. The hook end 602b has a curved shape that defines a hook recess 603 to retain the second guide 304 (e.g., the support pin 410) of the thrust reverser portion 120 as the thrust reverser portion 120 pivots relative to the pylon 108 between an installation position and the installed position. The hook body 602a has an upper surface 605 that facilitates location of the second guide 304 to the hook recess 603. For example, the second guide 304 can move (e.g., slide) along the upper surface 605 to enable the hook 602 to capture the second guide 304 when the thrust reverser portion 120 is coupled to the first guide 302.

The base 604 has a rectangular shape. For example, the base 604 includes a first side wall 606 and a second side wall 608 spaced from the first side wall 606. The base 604 also includes a front wall 610 and a rear wall 612 spaced from the front wall 610. The first side wall 606, the second side wall 608, the front wall 610 and the rear wall 612 define a cavity 614. The first side wall 606, the second side wall 608 and the rear wall 612 define a slot or recess 616. To define the recess 616, the rear wall 612 is positioned between a first end 604a of the base 604 and a second end 604b of the base 604 opposite the first end 604a. The front wall 610 includes an opening 618 (e.g., a cutaway) to receive the hook body 602a of the hook 602. In other words, the hook body 602a can extend within the cavity 614 of the base 604. The base 604 includes a block 620 (e.g., a support) to support (e.g., increase structural stability and/or strength) of the base 604. In the illustrated example, the support surface 622 has an angle 624 relative to horizontal. The block 620 of the base 604 has an angle 626 relative to horizontal that is complementary to the angle 624 of the support surface 622. For example, the angle 626 is identical to the angle 624 (e.g., between 20 degrees and 50 degrees). In some examples, the angle 624 can have any desired angle to enable access to a fastener 640.

The base 604 removably couples to the first one 506 of the first hinge components 204. To couple the base 604 to the first one 506 of the first hinge components 204, the first guide 302 employs a mounting fastener 628 (e.g., a mounting pin). To receive the mounting fastener 628, the base 604 includes a mounting aperture 630 and the first one 506 of the first hinge components 204 includes a mounting aperture 632. For example, the mounting apertures 630 and 632 align to receive the mounting fastener 628. The mounting aperture 632 of the base 604 is formed through the first side wall 606 and the second side wall 608 adjacent the rear wall 612.

Additionally, the hook 602 of the illustrated example is movably (e.g., slidably) coupled to the base 604 via an adjustor 636. To enable movement of the hook 602 relative to the base 604, the adjustor 636 of the illustrated example includes a slider 638 (e.g., a slider body or block) and an adjusting fastener 640 (e.g., an acme screw). To receive the adjusting fastener 640, the slider 638 includes a slider opening 642. The slider opening 642 includes threads 642a that interact with threads 640a of the fastener 640 to cause the slider 638 to move in a rectilinear direction 644 (e.g., parallel to a longitudinal axis 646) of the hook body 602a. For example, the fastener 640 and the slider 638 form a ball-and-screw mechanism, where rotation of the fastener 640 causes the hook 602 to move relative to the base in the rectilinear direction 644. The hook 602 can be adjusted in via the adjustor 636 in the rectilinear direction 644 to adjust a position of the hook 602 relative to the base 604 prior to attachment of the thrust reverser portion 120 or after attachment of the reverser portion 120 with the pylon 108. For example, when the thrust reverser portion 120 is attached to the pylon 108 via the guide system 300, the adjustor 636 can be employed to align (e.g., coaxially align) the hinge openings 210 of the thrust reverser portion 120 and the hinge openings 208 of the pylon 108 to enable insertion of the pin 410 via a close-fit connection.

To limit travel or movement of the hook 602 in the rectilinear direction 644, the first guide 302 of the illustrated example includes a stop 650 (e.g., a lock). The stop 650 of the illustrated example includes a stop body 652, a first limit pin 654 and a second limit pin 656. The stop body 652 includes a first stop pin opening 658 to receive the first limit pin 654 and a second stop pin opening 660 spaced from the first stop pin opening 658 to receive the second limit pin 656. The first stop pin opening 658 and the second stop pin opening 660 have longitudinal axes that are non-parallel (e.g., perpendicular) relative to the longitudinal axis 646 of the hook body 602a. Additionally, the stop 650 of the illustrated example includes a first slot 662 and a second slot 664 formed in each of the first side wall 606 and the second side wall 608 of the base 604. The first slots 662 and the second slots 664 receive the first limit pin 654 and the second limit pin 656, respectively. Thus, the first limit pin 654 and the second limit pin 656 extend through the hook body 602a to the first side wall 606 and the second side wall 608. The first slot 662 and the second slot 664 include an elongated or oblong shape. For example, each of the first and second slots 662, 664 has a length 668 parallel to the longitudinal axis 646 that defines the travel limits of the hook 602 relative to the base 604 in the rectilinear direction.

In the illustrated example, to protect the support surface 622 from damage as the hook 602 moves (e.g., slides) relative to support surface 622 via the adjustor 636 when the first guide 302 is attached to the first one 506 of the first hinge components 204, the first guide 302 includes a protective layer 670 (e.g., a protective barrier). The protective layer 670 of the illustrated example prevents damage (e.g., scratches) to the support surface 622. For example, the protective layer 670 can be coupled to the hook body 602a via adhesive and/or any other fastener(s). In some examples, the protective layer 670 can also be provided to the upper surface 605 of the hook body 602a. The protective layer 670 is removable and/or replaceable when it wears. The protective layer 670 can be composed of rubber, plastic, a Teflon tape, and/or any other sacrificial material(s).

Further, the hook 602 is a unitary structure. For example, the hook body 602a, the hook end 602b, the slider 638 and the lock are integrally formed as a unitary structure that can be formed (e.g., via machining) from metal (e.g., a block of steel). Similarly, the base 604 is a unitary structure (e.g., that formed from a block of metal (e.g., steel) via machining manufacturing process). Additionally, the first guide 302 and/or the second guide 304 can be configured to accommodate thrust reversers and/or pylons having different sizes or configurations. For example, the hook 602, the base 604, the adjustor 636 and/or the stop 650 can be configured to couple to with different types of first hinge components 204 and/or other pylons. In other examples, the first guide 302 and/or the second guide 304 can be configured or structured in any other manner.

Figure 7:
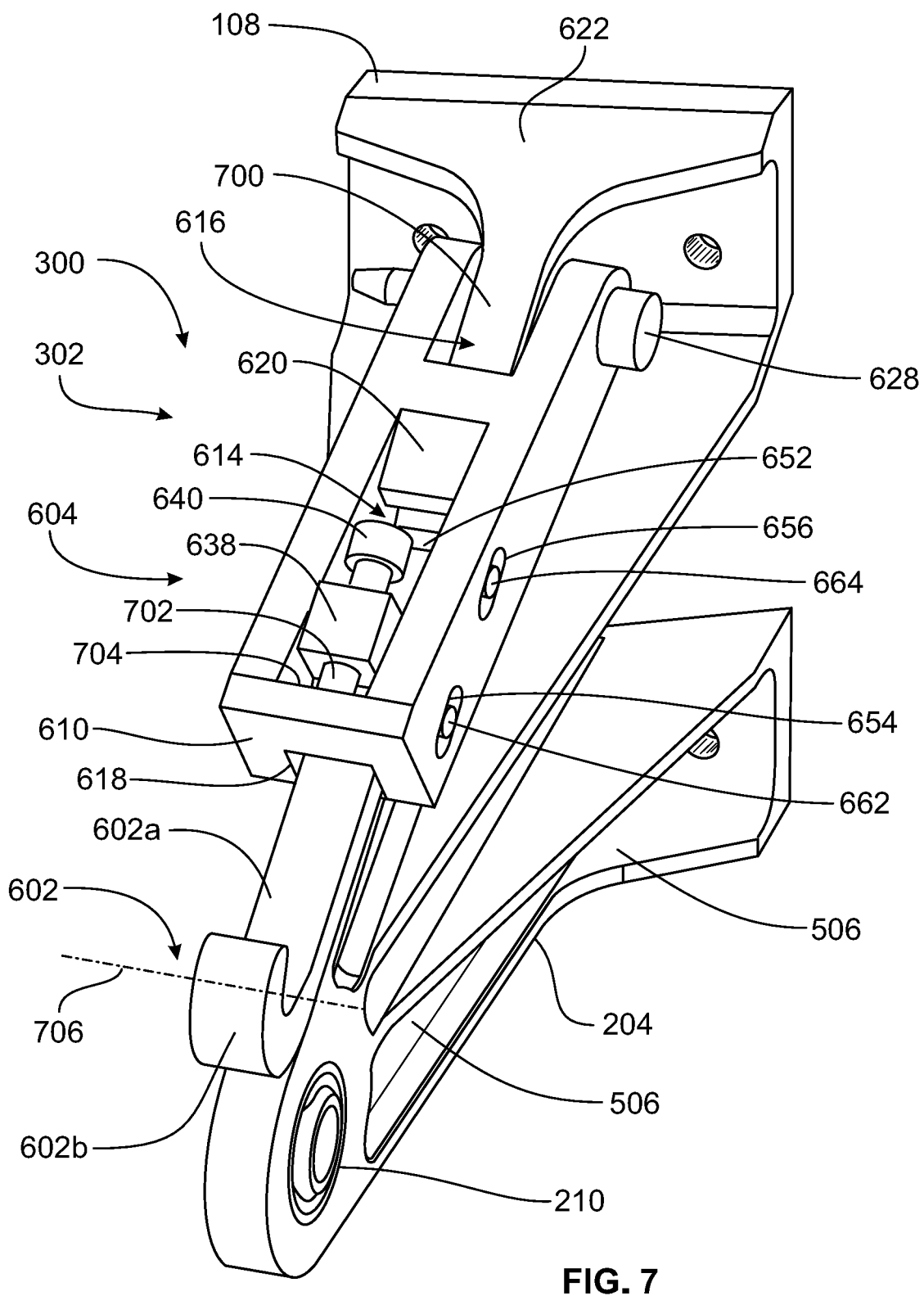
FIG. 7 is a perspective, assembled view of the example first guide of FIGS. 6A and 6B.

FIG. 7 is a perspective, assembled view of the first guide 302 of FIGS. 3-5, 6A and 6B. Referring to FIG. 7, the mounting fastener 628 secures or fixes the base to the first one 506 of the first hinge components 204. Specifically, the recess 616 of the base 604 receives a portion 700 of the first one 506 of the first hinge components 204 such that the mounting aperture 630 aligns (coaxially aligns) with the mounting aperture 632 of the first one 506 of the first hinge components 204 to receive the mounting fastener 628. Additionally, the hook 602 (e.g., the hook body 602a) engages (e.g., is supported by) the support surface 622. As shown in FIG. 7, the slider 638 and the stop body 652 are positioned in the cavity 614 of the base 604 and a portion of the hook body 602a protrudes from the recess of the front wall 610 of the base 604. An end 702 of the adjusting fastener 640 engages an inner surface 704 of the front wall 610 of the base 604. The first limit pin 654 is positioned in the first slot 662 and the second limit pin 656 is positioned in the second slot 664. The hook 602 of the illustrated example is positioned adjacent (e.g., above) the hinge opening 210. The hook end 602b defines an axis of rotation 706 about which the thrust reverser portion 120 rotates relative to the pylon 108 during installation or assembly of the thrust reverser portion 120 and the pylon 108.

Figure 8:
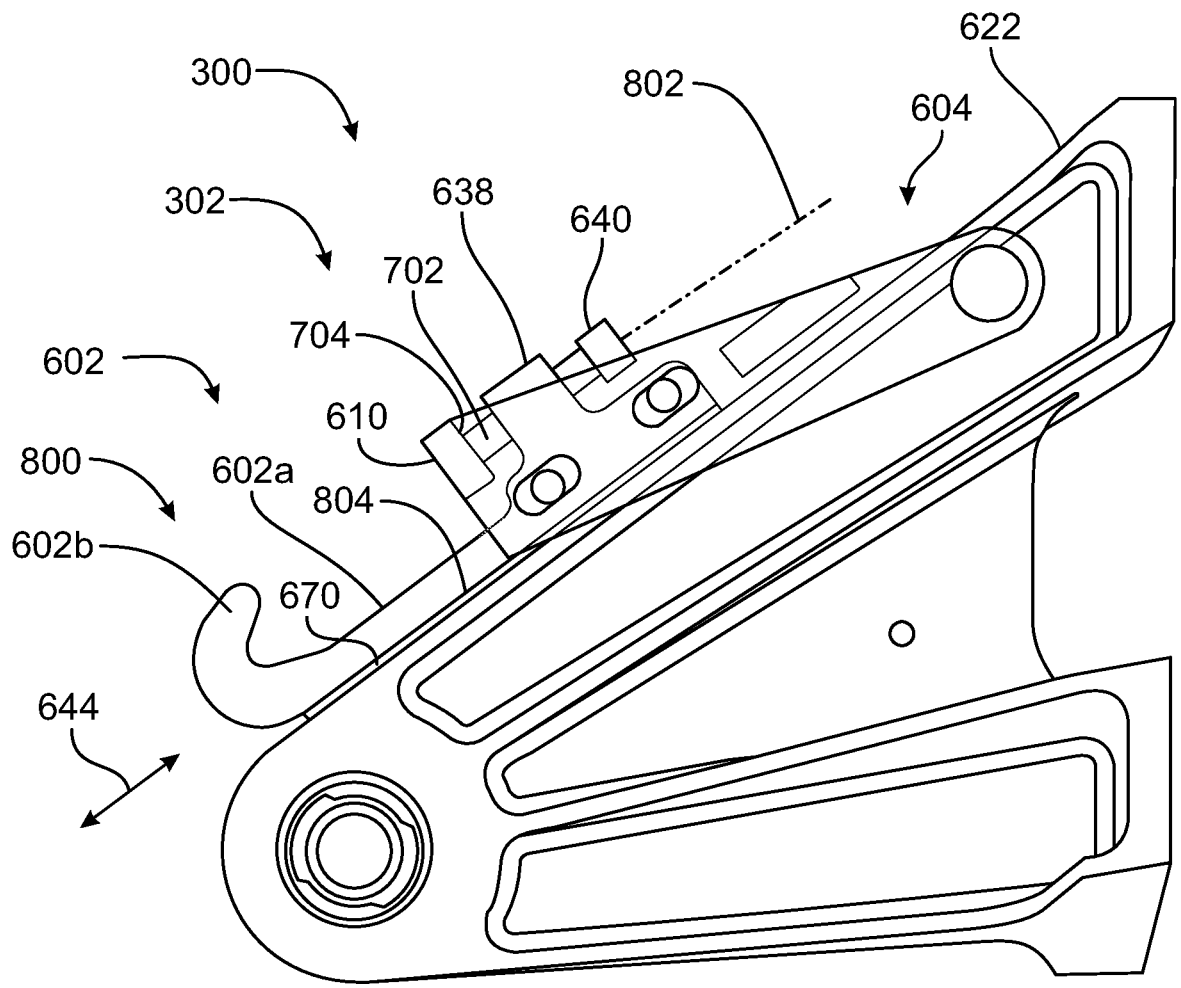
FIG. 8 is a side, assembled view of the example first guide of FIGS. 6A and 6B.

FIG. 8 is a side view of the first guide 302 of FIG. 7 showing the hook 602 in an operating position 800. The base 604 of FIG. 8 is shown in a transparent view. As shown in FIG. 8, the end 702 of the adjusting fastener 640 engages the inner surface 704 of the front wall 610. Rotation of the adjusting fastener 640 about a longitudinal axis 802 of the adjusting fastener 640 and engagement of the end 702 and the inner surface 704 causes the slider 638 to move in the rectilinear direction 644 relative to the base 604. As a result, the hook 602 moves in the rectilinear direction 644 because the hook 602 is coupled to (e.g., integrally formed with) the slider 638. The protective layer 670 is positioned between the support surface 622 and a bottom surface 804 of the hook body 602a. The protective layer 670 protects the support surface 622 from damage (e.g., scratches) as the hook 602 moves in the rectilinear direction 644. The operating position 800 can be predetermined or nominal position that is preset prior to coupling to the pylon 108 or when attached to the pylon 108 but prior to coupling the thrust reverser portion 120. In some examples, the operating position 800 can be adjusted or determined after the thrust reverser portion 120 is attached to the pylon 108 to enable adjustment (e.g., micro adjustment) to properly align (e.g., coaxially align) the hinge openings 208 with respective ones of the hinge openings 210. The operating position 800 can vary based on different types of thrust reverser portions and/or pylons.

Figure 9:
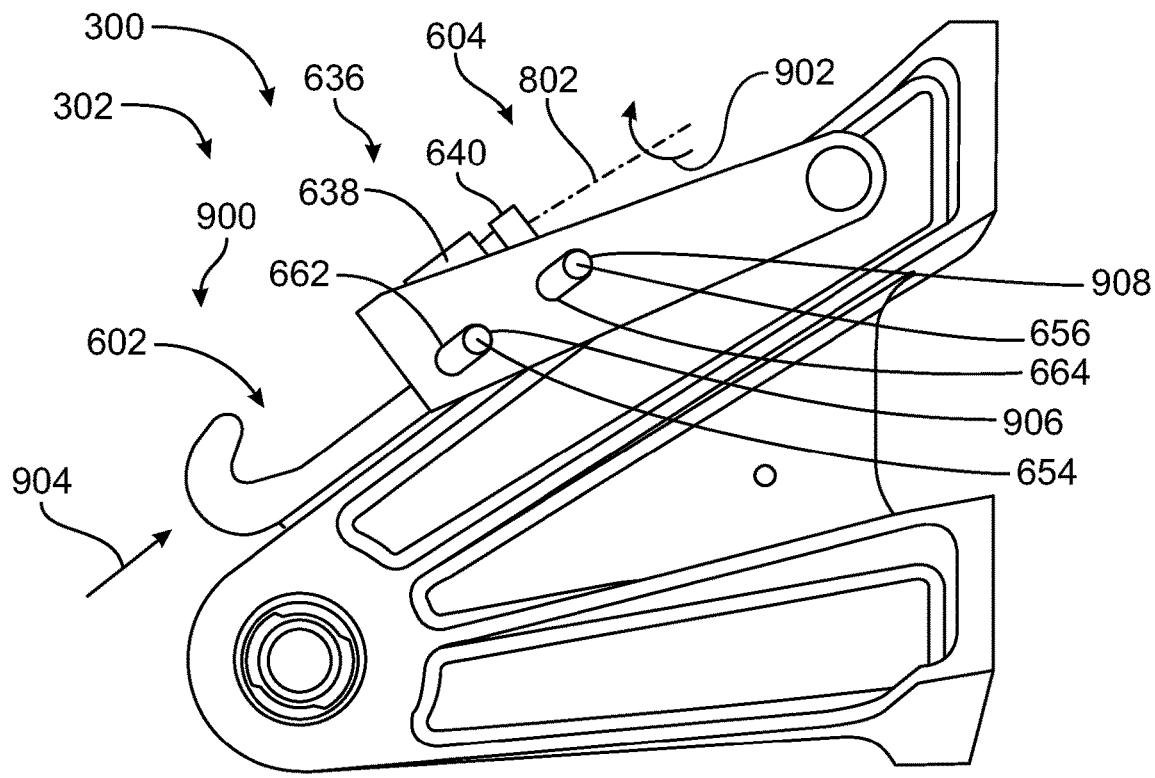
FIG. 9 is a side, assembled view of the example first guide of FIGS. 6A and 6B showing the example first guide in an example first position.

FIG. 9 is a side view of the first guide 302 of FIGS. 3-5, 6A, 6B, 7 and 8. As shown in FIG. 9, the hook 602 is a first hook position 900 (e.g., a first limit position). To move the hook 602 to the first hook position 900, the adjusting fastener 640 of the adjustor 636 is rotated in a first rotational direction 902 about the longitudinal axis 802 of the fastener 640 (e.g., a clockwise direction in the orientation of FIG. 9). Rotating the fastener 640 in the first rotational direction 902 causes the slider 638 and, thus, the hook 602 to move in a first rectilinear direction 904 (e.g., in a direction toward the base 604 in the orientation of FIG. 9). Specifically, in the first hook position 900, the first limit pin 654 engages a first end 906 of the first slot 662 and the second limit pin 656 engages a first end 908 of the second slot 664. The first ends 906, 908 of the respective slots 662 and 664 are closest to the rear wall 612 (FIGS. 6A and 6B). Thus, the stop 650 prevents or restricts movement of the hook 602 in the first rectilinear direction 904 beyond the first hook position 900.

Figure 10:
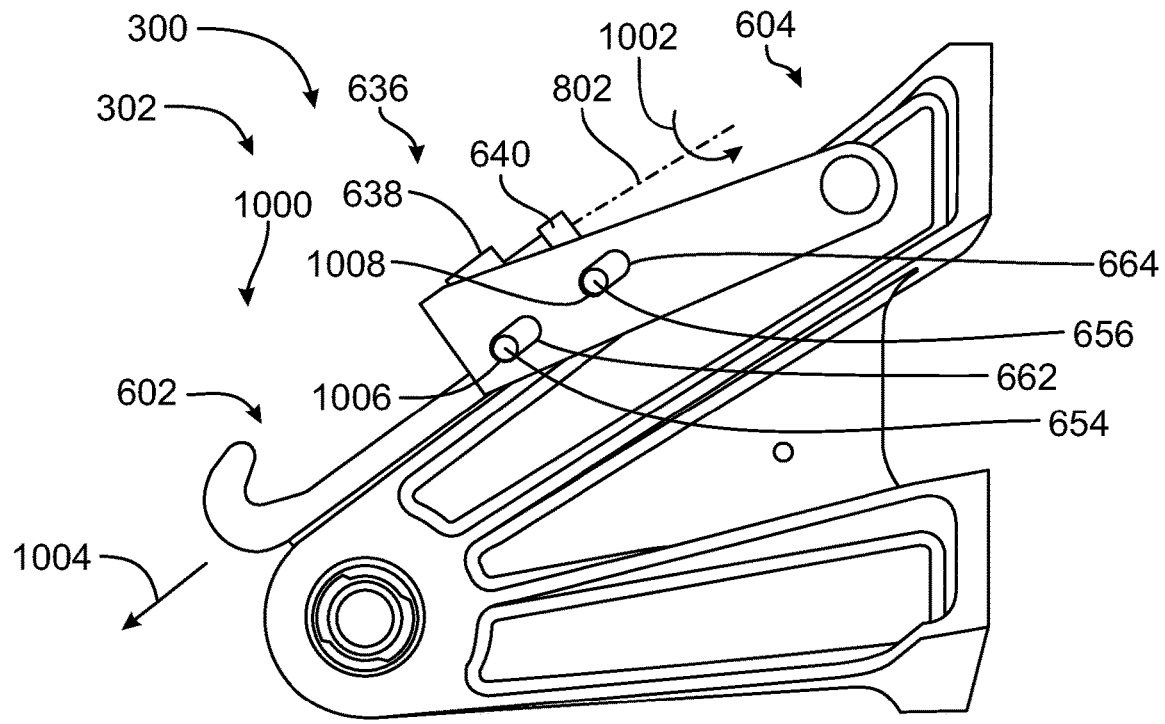
FIG. 10 is a side, assembled view of the example first guide of FIGS. 6A and 6B showing the example first guide in an example second position.

FIG. 10 is a side view of the first guide 302 of FIGS. 3-5, 6A, 6B, 7 and 8. As shown in FIG. 10, the hook 602 is in a second hook position 1000 (e.g., a second limit position). To move the hook 602 to the second hook position 1000, the adjusting fastener 640 of the adjustor 636 is rotated in a second rotational direction 1002 about the longitudinal axis 802 of the fastener 640 (e.g., a counterclockwise direction in the orientation of FIG. 10). Rotating the fastener 640 in the second rotational direction 1002 causes the slider 638 and, thus, the hook 602 to move in a second rectilinear direction 1004 (e.g., in a direction away from the base 604 in the orientation of FIG. 10). Specifically, in the second hook position 1000, the first limit pin 654 engages a second end 1006 of the first slot 662 and the second limit pin 656 engages a second end 1008 of the second slot 664. The second ends 1006, 1008 of the respective slots 662 and 664 are closest to the front wall 610 (FIGS. 6A and 6B) and opposite the respective first ends 906, 908 (FIG. 9). Thus, the stop 650 prevents or restricts movement of the hook 602 in the second rectilinear direction 1004 beyond the second hook position 1000. In some instances, the limit pins 654, 656 provide a redundant stop or fail-safe feature if the adjustor 636 fails to maintain a position of the hook 602 relative to the base 604. The operating position 800 is between the first hook position 900 and the second hook position 1000.

Figure 11:
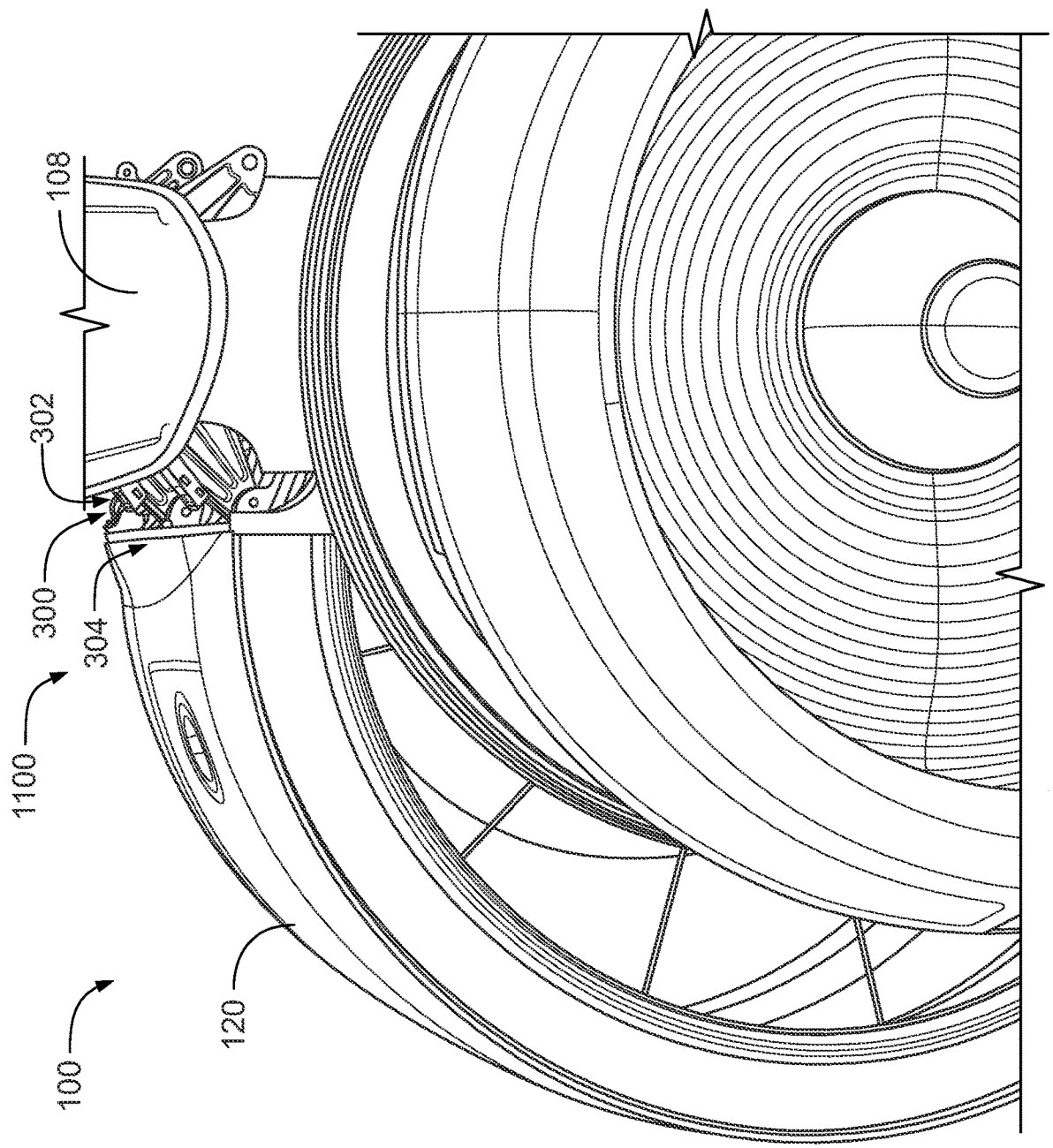
FIG. 11 is a front, partial perspective view of the example guide system and the example aircraft engine of FIG. 3 showing the example thrust reverser portion of the example aircraft engine in an example installation position.

FIG. 11 is a front view of the example aircraft 100 of FIG. 3 showing the thrust reverser portion 120 at an installation position 1100 (e.g., an installation angle) relative to the pylon 108. Prior to positioning the thrust reverser portion 120 in the installation position 1100, the guide system 300 is installed on the thrust reverser portion 120 and the pylon 108. For example, the second guide 304 is installed on the thrust reverser portion 120 (e.g., the first (TR) connector 402 is coupled to the first one 406 of the second hinge components 206 and the second (TR) connector 404 is coupled to the second one 408 of the second hinge components 206 as shown in FIG. 4) and the first guide 302 is coupled to the pylon 108 (e.g., the first pylon connector 502 is coupled to the first one 506 of the first hinge components 204 and the second pylon connector 504 is coupled to the second one 508 of the first hinge components 204 as shown in FIG. 5). The first pylon connector 502 and the second pylon connector 504 are positioned in the operating position 800 as shown in FIG. 8.

After the guide system 300 is installed on the thrust reverser portion 120 and the pylon 108, the thrust reverser portion 120 is moved toward the pylon 108 via, for example, a crane (e.g., an overhead crane). The thrust reverser portion 120 is lowered and maneuvered (e.g., via the crane) to an angular position (e.g., the installation position 1100) relative to the pylon 108 to cause engagement between the first guide 302 and the second guide 304. For example, the thrust reverser portion 120 is lowered to cause the first (TR) connector 402 to couple to the first pylon connector 502 and the second (TR) connector 404 to couple to the second pylon connector 504. In other words, the thrust reverser portion is lowered until the support pins 410 of the thrust reverser portion 120 engage respective ones of the hooks 602 supported by the pylon 108.

Figure 12:
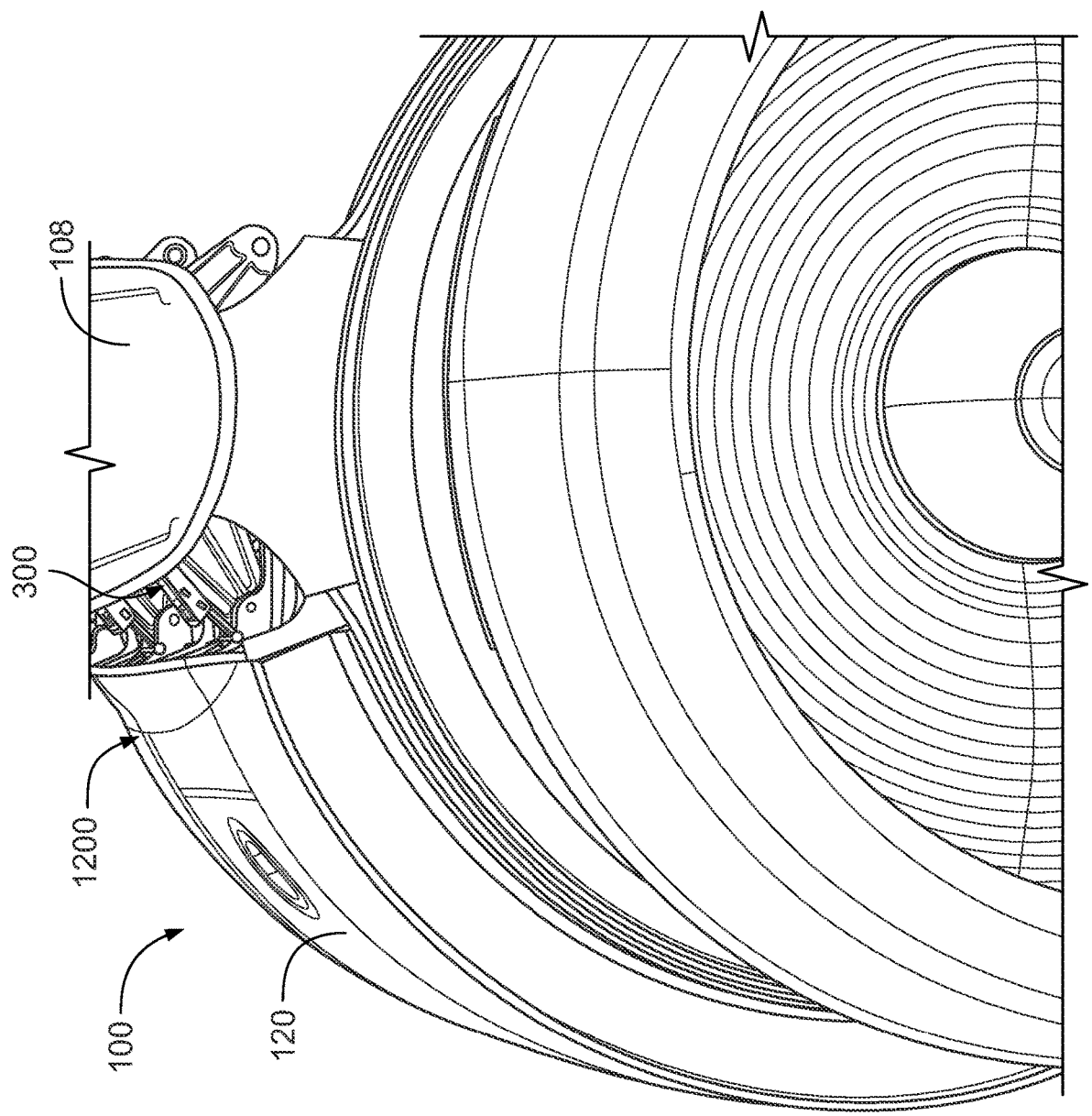
FIG. 12 is a front, partial perspective view of the example guide system and the example aircraft engine of FIG. 3 showing the example thrust reverser portion of the example aircraft engine in an example installed position.

FIG. 12 is a front view of the example aircraft 100 of FIG. 3 showing the thrust reverser portion 120 at an installed position 1200 (e.g., an installed angle) relative to the pylon 108. For example, the guide system 300 guides rotational and/or pivotal movement of the thrust reverser portion 120 relative to the pylon 108 from the installation position 1100 of FIG. 11 to the installed position 1200 of FIG. 12.

Figure 13:
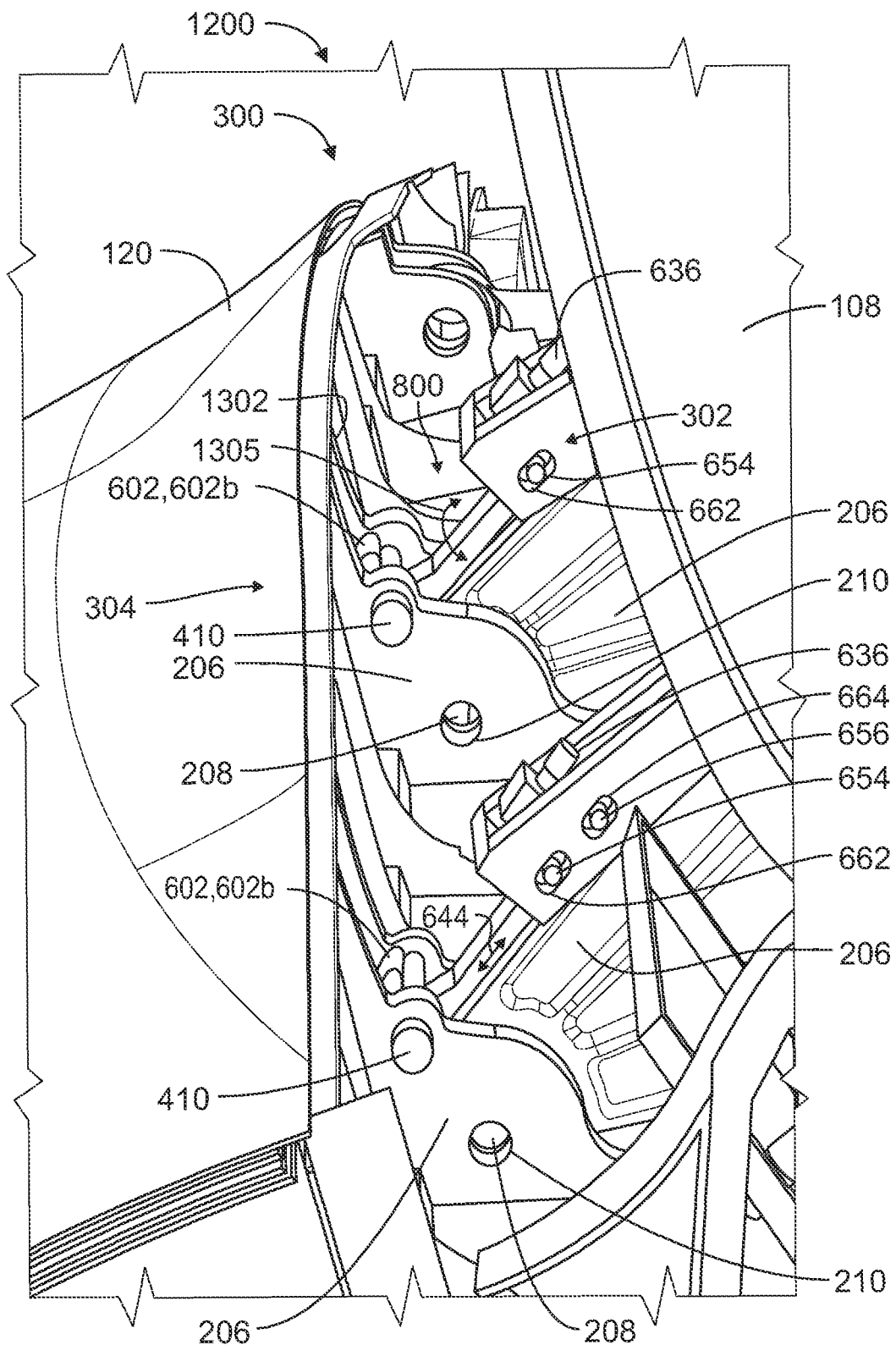
FIG. 13 is a perspective, enlarged view of the example hinge joint of the example aircraft engine and the example guide system of FIG. 12.

FIG. 13 is an enlarged view of the thrust reverser portion 120 and the pylon 108 of FIG. 12. The hooks 602 are shown in the operating position 800. For example, the hook end 602b is positioned between the support pins 410 of the second guide 304 and an inner wall 1302 of the thrust reverser portion 120. During rotation from the installation position 1100 to the installed position 1200, the support pins 410 remain in engagement with the hooks 602 as the thrust reverser portion 120 pivots from the installation position 1100 of FIG. 11 to the installed position 1200 of FIG. 12. Further, the hooks 602 maintain the operating position 800 (e.g., via the adjustor 636) during rotation to the installed position 1200. For example, the adjustor 636 (e.g., via engagement between the end 702 of the adjusting fastener 640 and the inner surface 704 of the front wall 610 as shown in FIG. 7) prevents movement of the hook 602 in the rectilinear direction 644 as the thrust reverser portion 120 pivots between the installation position 1100 and the installed position 1200.

As the thrust reverser portion 120 is rotated by the crane from the installation position 1100 of FIG. 11 to the installed position 1200 of FIG. 12, the guide system 300 guides the second hinge components 206 of the thrust reverser portion 120 into engagement and/or alignment with the first hinge components 204 of the pylon 108. In other words, the guide system 300 aligns (e.g. coaxially aligns) the hinge openings 210 of the second hinge components 206 and the hinge openings 208 of the first hinge components 204 to receive hinge pins (e.g., the hinge pins 1500 of FIG. 15).

Additionally, the guide system 300 maintains a position of the thrust reverser portion 120 fixed relative to the pylon 108. The load of the thrust reverser portion 120 is supported by the first hinge components 204 via load transfer provided by the guide system 300 (e.g., engagement between the support pins 410 to the hook 602). The first guide 302 and the second guide 304 prevent lateral movement of the first hinge components 204 relative to the second hinge components 206 when the thrust reverser portion 120 moves from the installation position 1100 to the installed position 1200. For example, the coupling or engagement between the first guide 302 and the second guide 304 stabilizes the thrust reverser portion 120 to prevent or restrict swaying or shifting (e.g. side-to-side movement) of the thrust reverser portion 120. In other words, the guide system 300 prevents or restricts the thrust reverser portion 120 from swinging, moving, or shifting (e.g., swaying or rocking) relative to the pylon 108 when the thrust reverser portion 120 is in the installed position 1200. Thus, a crane used to position the thrust reverser portion 120 to the installation position 1100 can be removed from the thrust reverser portion 120 when the thrust reverser portion 120 is in the installed position 1200 because the thrust reverser portion 120 is supported by the guide system 300.

Additionally, the hook 602 can be adjusted (e.g., a micro or fine adjustment) via the adjustor 636 (e.g., in the rectilinear direction 644) to coaxially align the hinge openings 208 and 210 if needed. For example, when the thrust reverser portion 120 is attached to the pylon 108 via the guide system 300, the adjustor 636 can be employed to align (e.g., coaxially align) the hinge openings 210 of the thrust reverser portion 120 and the hinge openings 208 of the pylon 108 to enable insertion of the pin 410 via a close-fit connection. The adjustor 636 can be used to move the hook 602 between approximately, for example, a tenth of an inch and a third of an inch.

Further, the first limit pin 654 and the second limit pin 656 engagement with the respective first slot 662 and the second slot 664 transfers a bending moment 1305 imparted about the longitudinal axis 646 (FIG. 6A) of the hook 602 by the thrust reverser portion 120 to the first hinge components 204 of the pylon 108. Thus, if a load is imparted to the hook 602 by the support pin 410 that causes the bending moment 1305 about the hook body 602a, the first limit pin 654 and the second limit pin 656 transfer the bending moment 1305 to the pylon 108 and prevent or restrict rotation of the hook 602 (e.g., the hook body 602a) about the longitudinal axis 646 (FIG. 6A), thereby maintaining the thrust reverser portion 120 in a stable (e.g., fixed) position. Thus, the guide system 300 provides active retention that can self-support a load of the thrust reverser portion 120 (e.g., which enables removal of the thrust reverser portion from a crane prior to installment of the hinge pins 1500).

Figure 14:
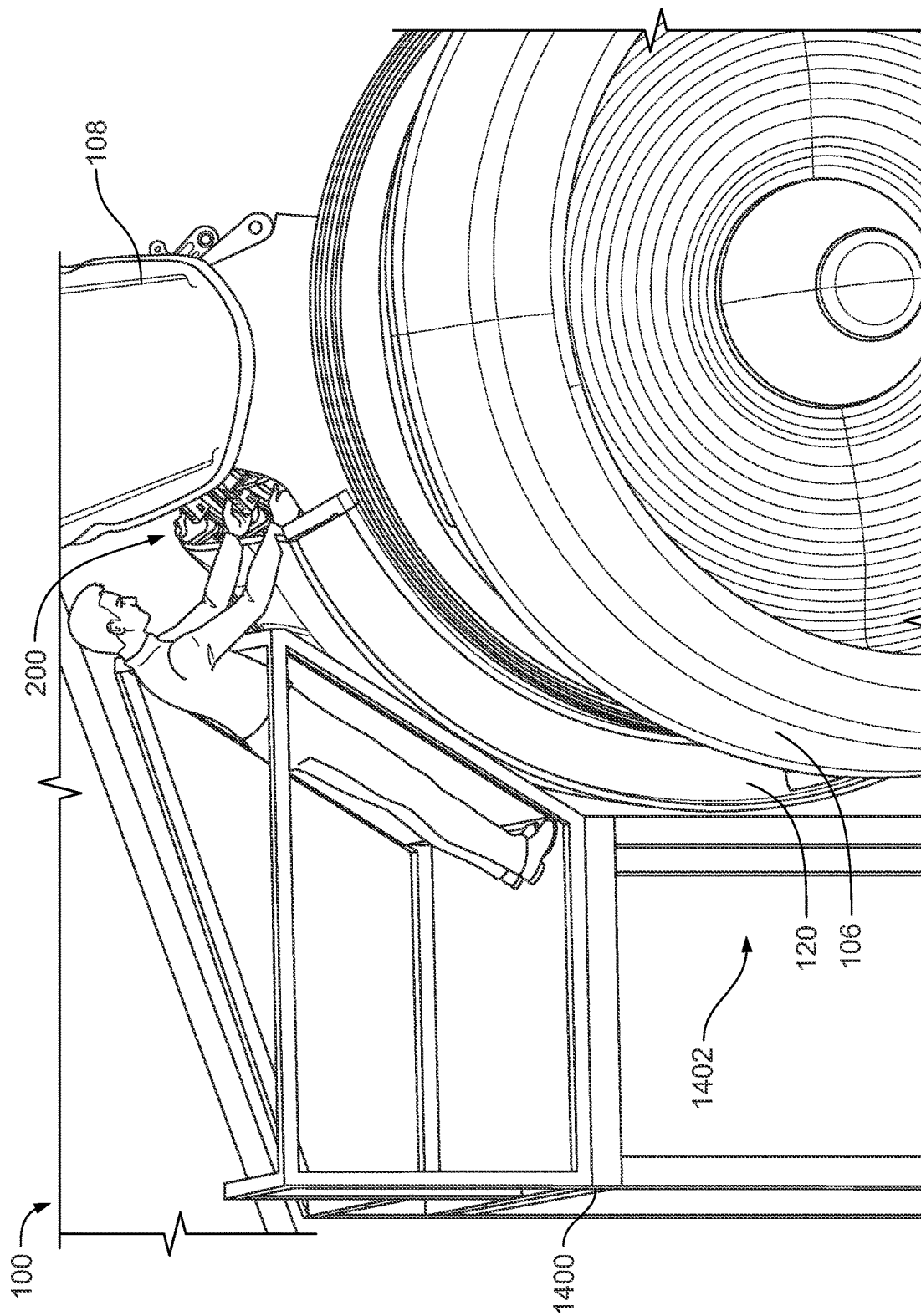
FIG. 14 is a perspective view of the example aircraft engine of FIGS. 1 and 2 and an example platform to enable access to the example hinge joint and the guide system of FIGS. 12 and 13.

FIG. 14 is a front view of the example aircraft 100 with a platform 1400 adjacent the aircraft engine 106. The platform 1400 can be positioned adjacent a side 1402 of the aircraft engine 106 adjacent the hinge 200 because a crane that would otherwise be required to hold or maintain a position of the thrust reverser portion 120 is removed. The platform 1400 enables a technician to access the hinge 200 and install hinge pins 1500 (FIG. 15) into the hinge openings 208 and the hinge openings 210 (e.g., the coaxially aligned hinge openings 208, 210) with the thrust reverser portion 120 fixed (e.g., in the fore-aft direction and/or side-to-side movement) relative to the pylon 108. The platform 1400 provides ergonomic installation of the hinge pins 1500 by allowing the technician to be in an upright position when installing the hinge pins 1500 and does not require the technician to lay across an upper surface of the aircraft engine 106. Additionally, in some examples, the guide system 300 and/or the platform 1400 does not require active fall protection measures (e.g., a harness and fall-restraint lanyard, etc.) for technicians (e.g., during installing the hinge pins 1500).

Figure 15:
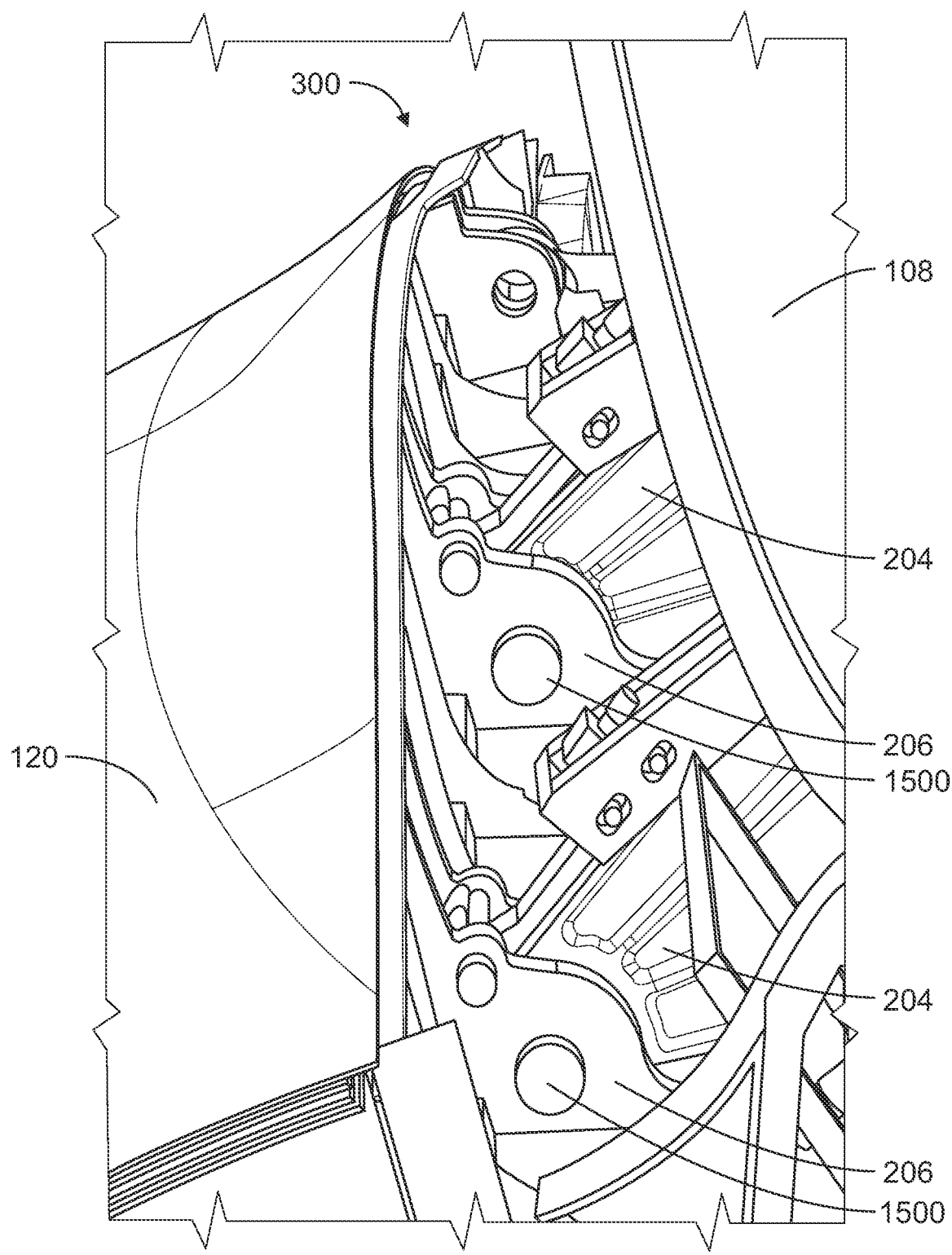
FIG. 15 is a perspective, enlarged view of the example hinge joint and the guide system showing an example hinge pin installed with the example hinge joint.

FIG. 15 is an enlarged position of the thrust reverser portion 120 and the pylon 108 showing hinge pins 1500 installed with the first hinge components 204 and the second hinge components 206. The technician can install the hinge pins 1500 via the platform 1400 of FIG. 14. The guide system 300 reduces or eliminates risk of the thrust reverser portion 120 swaying or rocking (e.g., sideways, back-and-forth, etc.) when the hinge pins 1500 are inserted into the hinge openings 208 and 210. Additionally, prior to installing the hinge pins 1500, the hook 602 can be adjusted via the adjustor 636 to coaxially align the hinge openings 208 and 210. For example, the adjustor 636 can be employed to make small adjustments (e.g., between one-tenth of an inch to one-third of an inch) to facilitate coaxial alignment of the hinge openings 208 and 210 when the thrust reverser portion 120 is in the installed position 1200.

Figure 16:
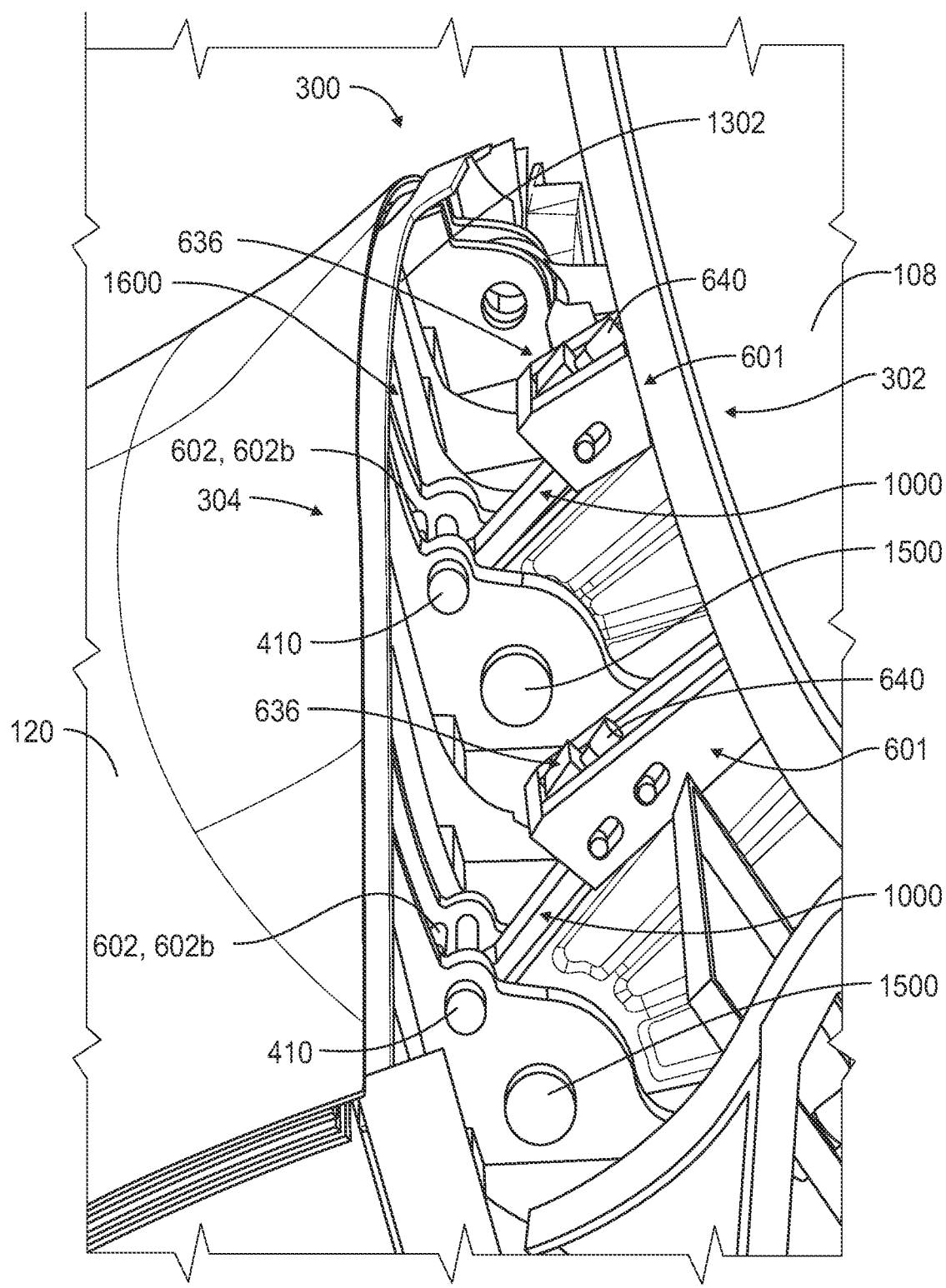
FIG. 16 is a perspective, enlarged view of the example hinge joint and the example guide system showing the example first guide in an example release position.
Figure 17:
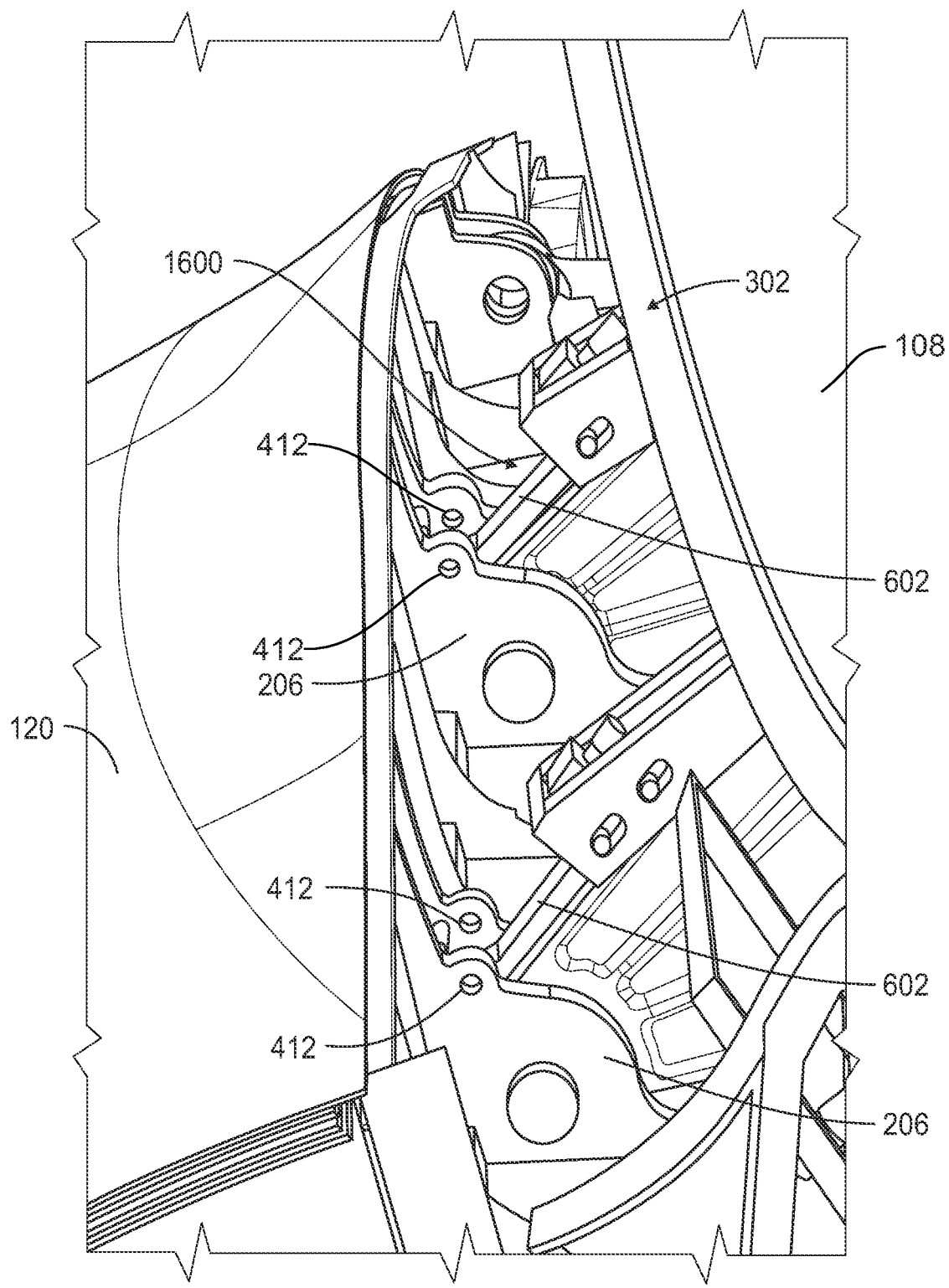
FIG. 17 is a perspective, enlarged view of the example hinge joint and the example guide system showing an example second guide of the example guide system removed from the example thrust reverser portion.
Figure 18:
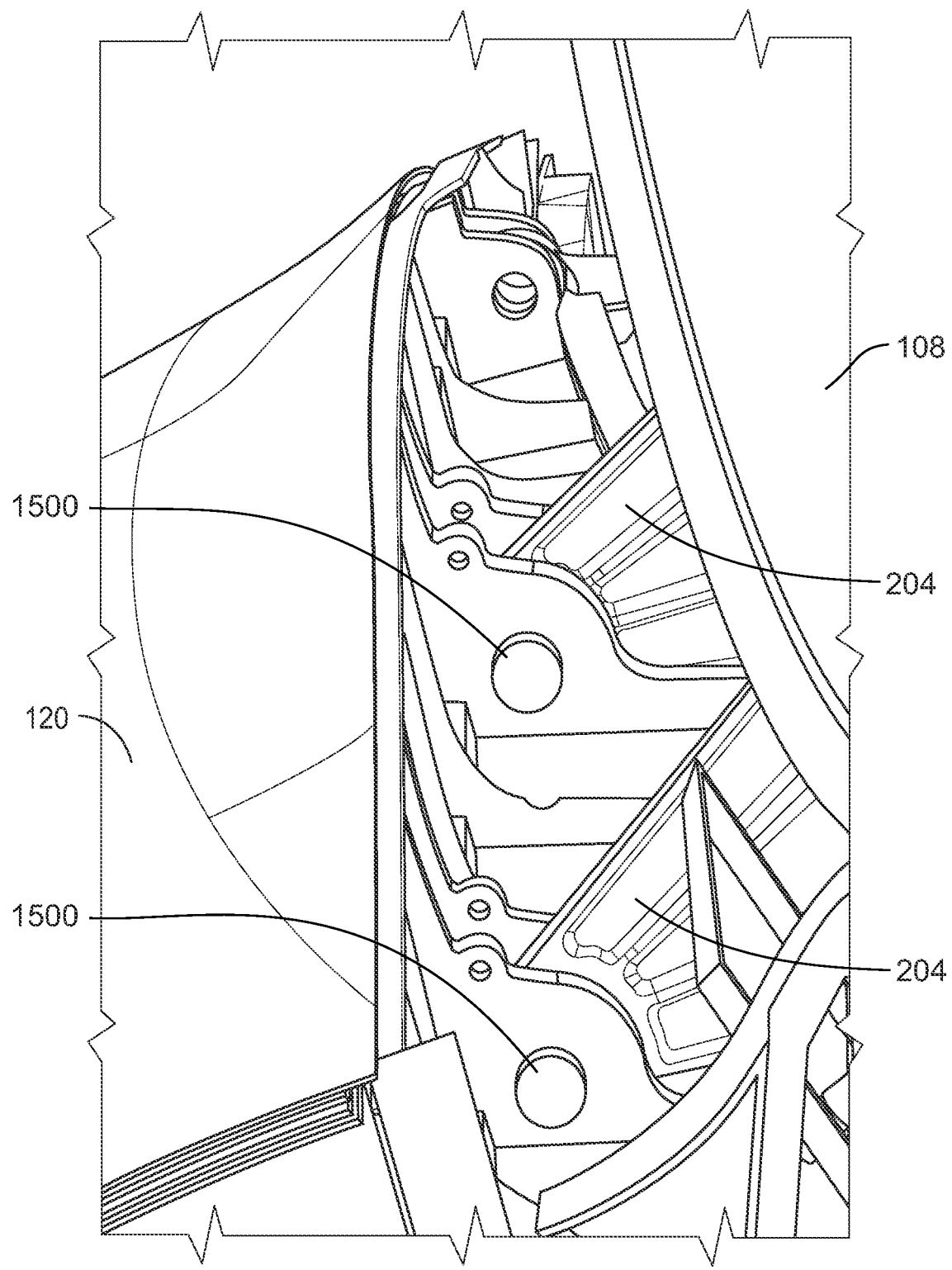
FIG. 18 is a perspective, enlarged view of the example hinge joint and the example guide system showing the example first guide of the example guide system removed from the example pylon.

FIGS. 16-18 illustrate removal of the guide system 300 after installing the hinge pins 1500. After the hinge pins 1500 have been installed, the guide system 300 is removed from the thrust reverser portion 120 and the pylon 108. FIG. 16 is an enlarged portion of the thrust reverser portion 120 and the pylon 108. To remove the guide system 300, the first guide 302 is moved to a release position 1600 to disengage the second guide 304. For example, the hook 602 of each hook assembly 601 is moved to the second hook position 1000 via the adjustor 636. For example, the technician, via the platform 1400, rotates the adjusting fastener 640 in the second rotational direction 1002 (FIG. 10) to move the hook 602 to the second hook position 1000. Moving the hook 602 to the second hook position 1000 releases tension and/or engagement with the second guide 304. For example, when the hook 602 is in the second hook position 1000, the hook 602 moves toward the inner wall 1302 of the thrust reverser portion 120 and away from the support pin 410. In other words, the hooks 602 of each hook assembly 601 move out of engagement with (e.g., disengages from) respective ones of the support pins 410 of the second hinge components 206. Releasing this tension or force enables the technician to remove the support pins 410 from the second hinge components 206. A load of the thrust reverser portion 120 is supported by the hinge pins 1500 when the hook 602 is in the release position 1600.

FIG. 17 is an enlarged view of the thrust reverser portion 120 and the pylon 108 of FIG. 16 with the second guide 304 removed from the second hinge components 206. Specifically, with the hook 602 in the release position 1600, the technician can remove the support pins 410 (FIG. 16) from the support pin openings 412 of the second hinge components 206.

FIG. 18 is an enlarged view of the thrust reverser portion 120 and the pylon 108 of FIG. 17 with the first guide 302 (FIG. 17) removed from the first hinge components 204. To remove the first guide 302, the mounting fastener 628 of each hook assembly 601 is removed from the base 604 and the respective first hinge components 204. When the mounting fastener 628 is removed, the hook assembly 601 is lifted away (e.g., removed) from the first hinge components 204. As shown in FIG. 18, the installation of the hinge pins 1500 between the thrust reverser portion 120 and the pylon 108 pivotally couples the thrust reverser portion 120 and the pylon 108.

Figure 19:
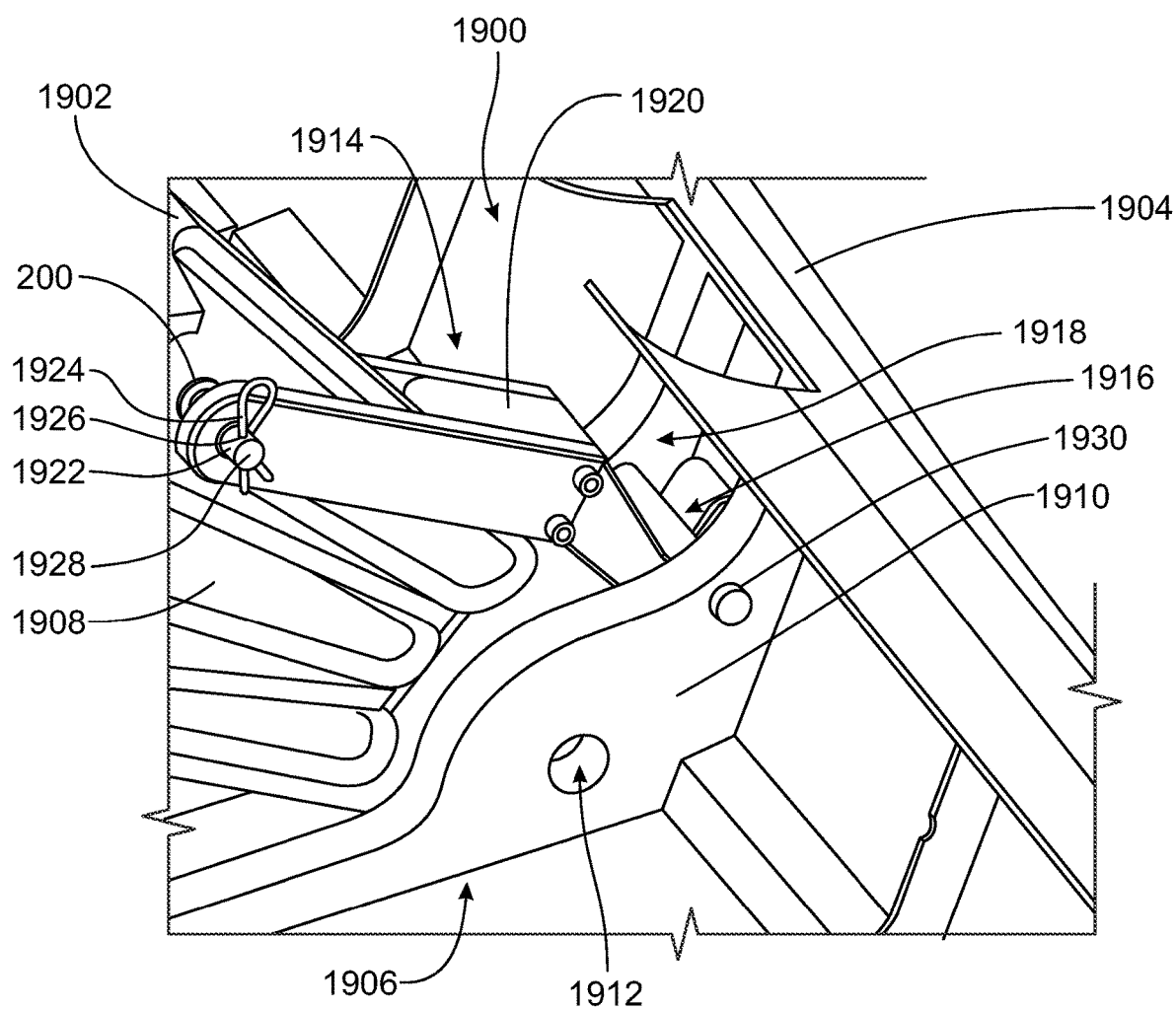
FIG. 19 is a perspective view of another example guide system disclosed herein.

FIG. 19 is a perspective view of another guide system 1900 disclosed herein. The guide system 1900 is shown in a perspective view and coupled to a pylon 1902 and a thrust reverser portion 1904. For example, the pylon 1902 and the thrust reverser portion 1904 form a hinge 1906 (e.g., a hinge joint). The hinge 1906 is defined by a first hinge component 1908 of the pylon 1902 and a second hinge component 1910 of the thrust reverser portion 1904. In some examples, the hinge 1906 is a lug-and-clevis joint. To form the lug-and-clevis type hinge 1906, the first hinge component 1908 of the pylon 1902 of the illustrated example is a lug and a second hinge component 1910 of the thrust reverser portion 1904 of the illustrated example is a clevis. In some examples, the thrust reverser portion 1904 can include the lug and the pylon 1902 can include the clevis. In some examples, other structures can be employed to define the hinge 1906. In some examples, the pylon 1902 can be structured substantially similar (e.g., identical) to the pylon 108 of FIG. 2 and the thrust reverser portion 1904 can be structured similar or identical to the thrust reverser portion 120 of FIG. 2

The guide system 1900 facilitates alignment between the thrust reverser portion 1904 and the pylon 1902. Specifically, the guide system 1900 facilitates alignment between the first hinge component 1908 and the second hinge component 1910 to provide a hinge pin opening 1912 structured to receive a hinge pin (e.g., the hinge pin 1500 of FIG. 15) when the thrust reverser portion 1904 couples to the pylon 1902 and is positioned in an installed position (e.g., the installed position 1200 of FIG. 12). The guide system 1900 of the illustrated example includes a first guide 1914 (e.g., a first installation tool) and a second guide 1916 (e.g., a second installation tool). The first guide 1914 is removably coupled to the pylon 1902 (e.g., a first aircraft structure), which includes or supports the first hinge component 1908. The second guide 1916 is removably coupled to the thrust reverser portion 1904 (e.g., a second aircraft structure), which includes or supports the second hinge component 1910. The first guide 1914 interfaces with the second guide 1916 to facilitate installation of the thrust reverser portion 1904 and the pylon 1902. In some examples, the second guide 1916 can include (e.g., be configured with) a camming feature (e.g., a camming feature of FIG. 24) to enable adjustment and/or alignment (e.g., coaxial alignment) of the hinge pin opening 1912 (e.g., to enable installation of a hinge pin via a close-fit connection).

In operation, the first guide 1914 is removably attached to the pylon 1902 and the second guide 1916 is removably attached to the thrust reverser portion 1904. With the first guide 1914 coupled to the pylon 1902 and the second guide 1916 coupled to the first thrust reverser portion 1904, a crane is employed to move the thrust reverser portion 1904 toward the pylon 1902. When at an installation angle (e.g., the installation position 1100 of FIG. 11), the second guide 1916 interfaces or couples with the first guide 1914 (e.g., via a crane). Engagement between first guide 1914 and the second guide 1916 enables alignment between the first hinge component 1908 and the second hinge component 1910 when the thrust reverser portion 1904 is moved from an installation position (e.g., the installation position 1100 of FIG. 11)

to an installed position (e.g., the installed position 1200 of FIG. 12) relative to the pylon 1902. An interface 1918 provided between the first guide 1914 and the second guide 1916 enables the thrust reverser portion 1904 to pivot relative to pylon 1902.

The first guide 1914 includes a first pylon connector 1920. The first pylon connector 1920 is coupled to the first hinge component 1908 via a mounting fastener 1922. The mounting fastener 1922 is retained to the first hinge component 1908 and the first pylon connector 1920 via a retainer 1924 (e.g., a retaining pin) that passes through a retainer opening 1926 formed adjacent an end 1928 of the mounting fastener 1922. The second guide 1916 of the illustrated example includes a thrust reverser (TR) connector 1930. For example, the TR connector 1930 is coupled to the second hinge components 1910. The TR connector 1930 of the illustrated example is a support pin (e.g., a support pin that is substantially similar or identical to the support pin 410 of FIG. 4). In some examples, the TR connector 1930 is a support pin having a camming feature to enable alignment of the hinge opening 1912 (e.g., a support pin that is substantially similar or identical to a pin 2400 of FIG. 24).

Figure 20:
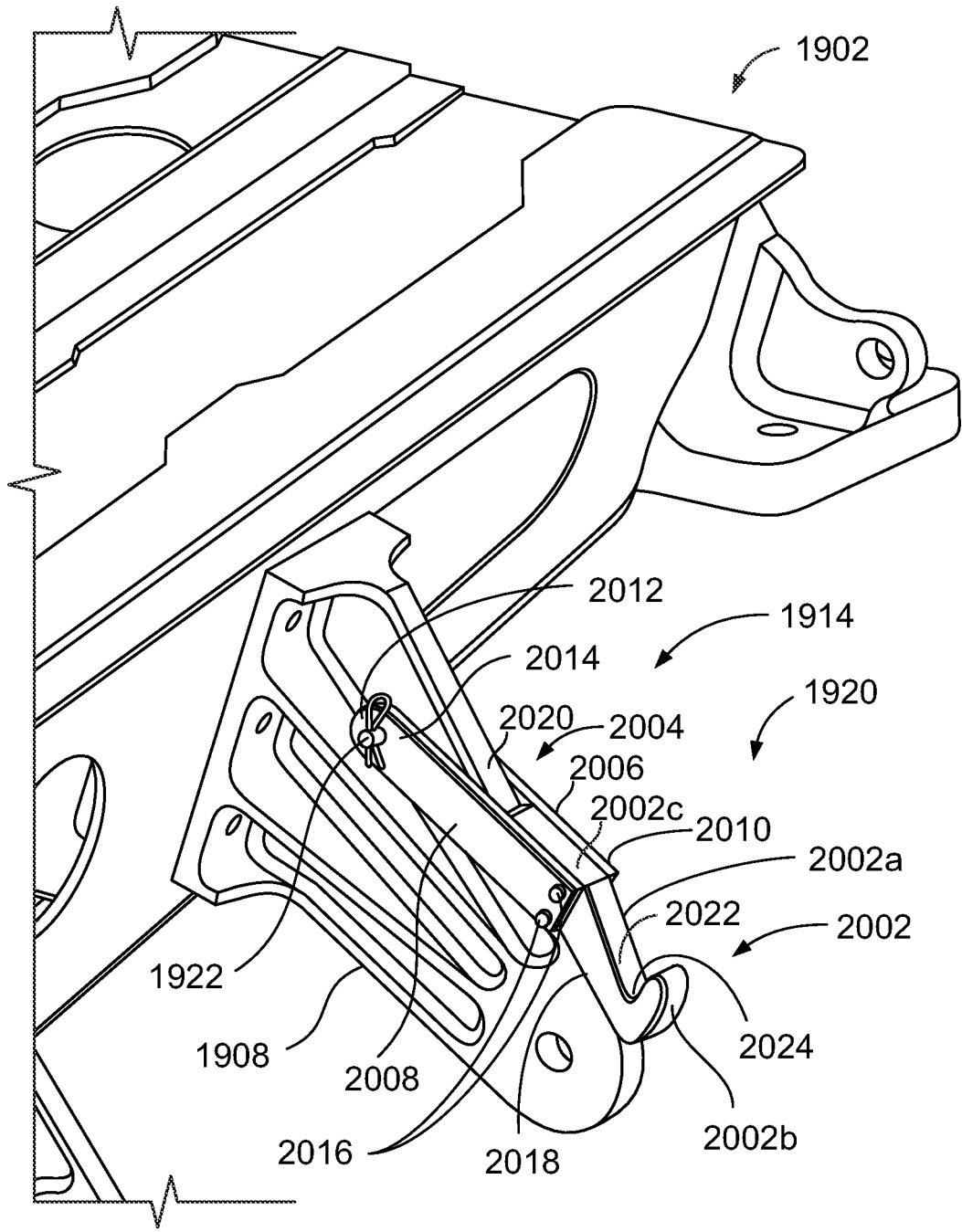
FIG. 20 is a perspective view of an example first guide of the example guide system of FIG. 19.

FIG. 20 is a perspective view of the first guide 1914 coupled to the first hinge component 1908. The first guide 1914 of the illustrated example includes a hook 2002 (e.g., a retainer) and a base 2004. The base 2004 includes a first side wall 2006 and a second side wall 2008 spaced from the first side wall 2006. The first and second side walls 2006, 2008 define a first end 2010 and a second end 2012 of the base 2004. The base 2004 includes a mounting aperture 2014 (formed through the first side wall 2006 and the second side wall 2008 adjacent the second end 2012) to receive the mounting fastener 1922. The first end 2010 of the base 2004 receives the hook 2002. The hook 2002 includes a hook body 2002a, a hook end 2002b, and a hook mounting block 2002c. The hook mounting block 2002c is positioned between the first side wall 2006 and the second side wall 2008. One or more fasteners 2016 couple or fasten the hook 2002 to the base 2004. Thus, the hook 2002 is fixed relative to the base 2004. In other words, a position of the hook 2002 cannot be adjusted relative to the base 2004 after the fasteners 2016 are tightened. In some examples, the hook mounting block 2002c can include a plurality of spaced apart pairs of openings that can receive the fasteners 2016 to adjust a position of the hook 2002 relative to the base 2004. The hook 2002 is supported by (e.g., rests on) a support surface 2020 of the first hinge component 1908. The hook 2002 of the illustrated example has a bottom surface 2018 (e.g., a planar surface) that engages (e.g., matably engages) a support surface 2020 of the first hinge component 1908. The base 2004 receives a portion of the first hinge component 1908 between the first side wall 2006 and the second side wall 2008 when the base 2004 is coupled to the first hinge component 1908. The hook body 2002a defines a locating surface 2022 that tapers toward a hook recess 2024 (e.g., a well) formed by the hook end 2002b. The locating surface 2022 is an upper surface of the hook body 2002a that enables the second guide 1916 to move along (e.g., slide) when the thrust reverser portion 1904 is moved to the installation position (e.g., the installation position 1100 of FIG. 11) via the crane. Thus, the locating surface 2022 facilities positioning a support pin of the second guide 1916 in the hook recess 2024 of the hook end 2002b. In some examples, the locating surface 2022 can include a protective layer or material (e.g., a rubber, a plastic, etc.) to prevent damage to the hook body 2002a when the second guide 1916 moves (e.g. slides) along the locating surface 2022 toward the hook recess 2024.

In operation, as the thrust reverser portion 1904 rotates from an installation angle (e.g., the installation position 1100 of FIG. 11) to an installed angle (e.g., the installed position 1200 of FIG. 12), the second guide 1916 (e.g., the TR connector 1930) remains engaged with the hook 2002 of the first guide 1914 (e.g., the support pin is captured by the hook 2002). In the installed position, a crane supporting the thrust reverser portion 1904 can be removed and a technician can employ a platform (e.g., the platform 1400) to install a hinge pin (e.g., the hinge pin 1500) in the hinge pin opening 1912. After the hinge pin is installed with the hinge pin opening 1912, the second guide 1916 is removed from the second hinge component 1910 (FIG. 19). To facilitate removal of the second guide 1916, the fasteners 2016 can be removed to allow movement of the hook 2002 and release a tension imparted to the second guide 1916 prior to removal of the second guide 1916. In some examples, the second guide 1916 (e.g., the TR connector 1930) can include a camming feature to release tension in the first guide 1914 after installation of a hinge pin in the hinge opening 1912. In some examples, the thrust reverser portion 1904 can be rotated (e.g., slightly to an open position or slightly toward an installation position) to release a load or tension from the TR connector 1930 to facilitate removal of the TR connector 1930 from the thrust reverser portion 1904. The mounting fastener 1922 can be removed to remove the base 2004 from the first hinge component 1908.

Figure 21:
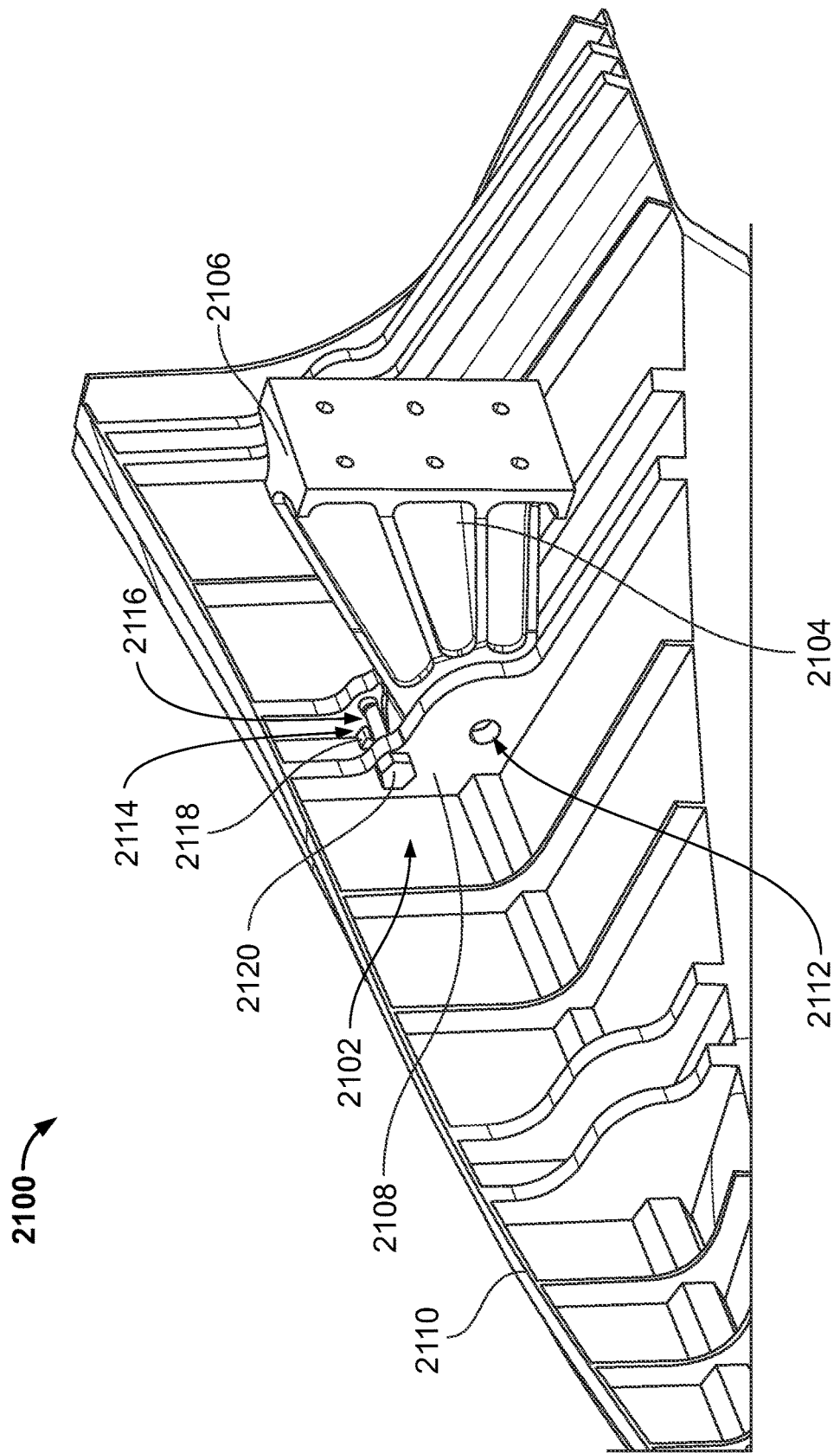
FIG. 21 is a perspective view of an example pylon and an example thrust reverser portion implemented with another example guide system disclosed herein.

FIG. 21 is a perspective view of another guide system 2100 disclosed herein. The guide system 2100 facilitates assembly of a hinge 2102 defined by a first hinge component 2104 of a pylon 2106 and a second hinge component 2108 of a thrust reverser portion 2110 (e.g., a thrust reverser wall or section). In some example, the hinge 2102 is a lug-and-clevis joint. The guide system 2100 facilitates alignment of a hinge pin opening 2112. The hinge pin opening 2112 is defined by the first hinge component 2104 and the second hinge component 2108 and is structured to receive a hinge pin (e.g., the hinge pin 1500 of FIG. 15) to couple (e.g., pivotally couple) the thrust reverser portion 2110 and the pylon 2106. The guide system 2100 of the illustrated example includes a first guide 2114 and a second guide 2116. The first guide 2114 is fixed to the pylon 2106 (e.g., a first aircraft structure), which includes or supports the first hinge component 2104. The second guide 2116 is removably coupled to the thrust reverser portion 2110 (e.g., a second aircraft structure), which includes or supports the second hinge component 2108. The first guide 2114 includes a first pylon connector 2118. The second guide 2116 of the illustrated example includes a thrust reverser (TR) connector 2120. For example, the TR connector 2120 is coupled to the second hinge components 2108.

Figure 22:
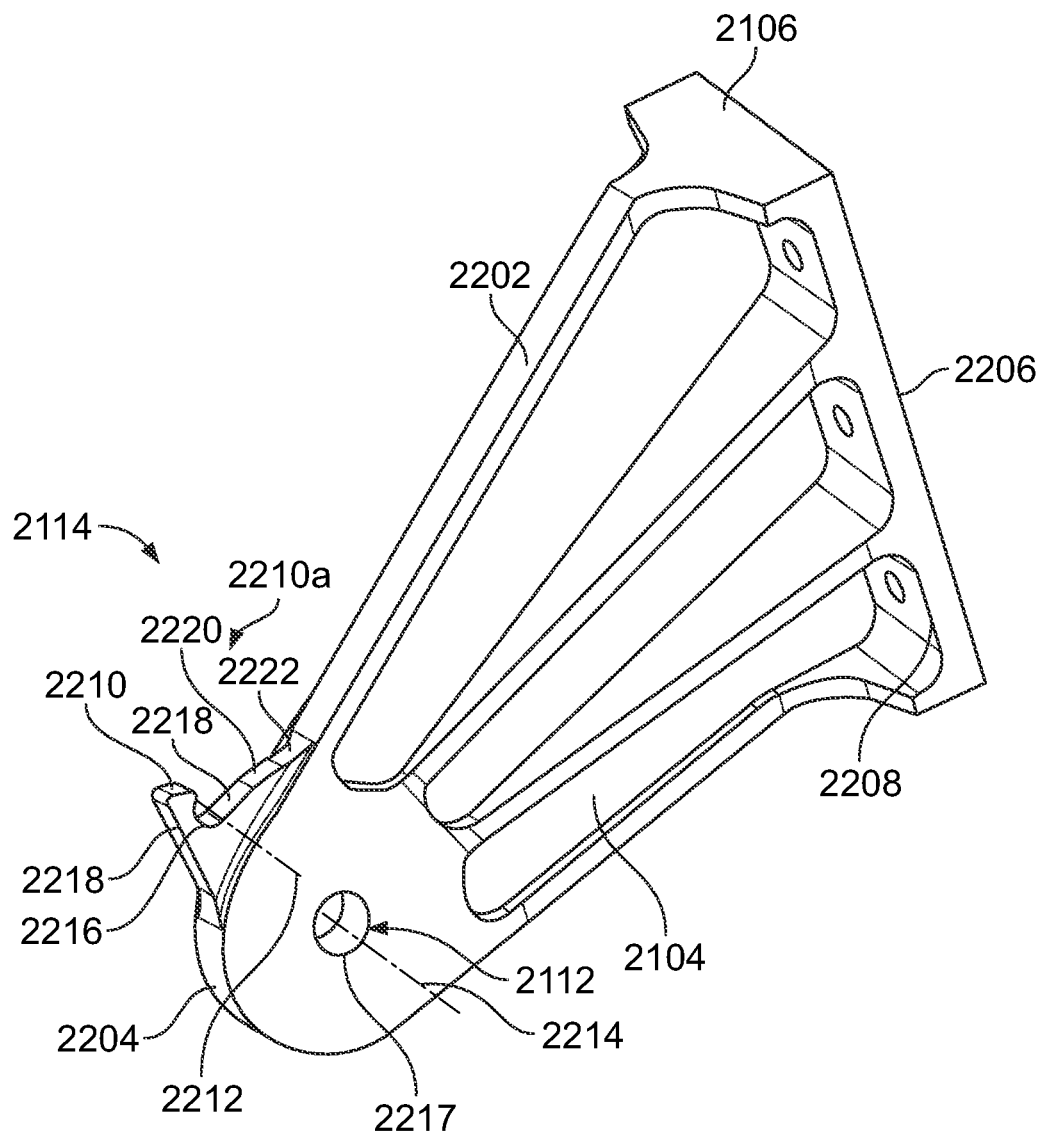
FIG. 22 is a perspective view of an example first guide of the example guide system of FIG. 21.

FIG. 22 is a perspective view of the example first hinge component 2104 of the pylon 2106 and the first guide 2114. The first guide 2114 of the illustrated example is integrally formed with the first hinge component 2104 of the pylon 2106. In other words, the first guide 2114 is fixed to the first hinge component 2104 and cannot be removed or decoupled from the first hinge component 2104. The first guide 2114 of the illustrated example projects or protrudes from a support surface 2202 of the first hinge component 2104. Specifically, the first guide 2114 is located adjacent a first end 2204 of the first hinge component 2104 opposite a second end 2206. The second end 2206 of the illustrated example has a mounting flange 2208 that receives fasteners to secure the first hinge component 2104 to the pylon 2106. The pylon 2106 of FIG. 22 includes an integral guide pin feature. Specifically, the first guide 2114 of the illustrated example has a hook 2210 (e.g., a retainer) to engage and/or receive the second guide 2116 (FIG. 21). For example, the hook 2210 defines a temporary rotational axis 2212 about which the second guide 2116 (FIG. 21) rotates as the thrust reverser portion 2110 moves from an installation position to an installed position. The temporary rotational axis 2212 is offset from a hinge pin axis 2214 provided by an opening 2217 of the first hinge component 2104 defining the hinge pin opening 2112 (FIG. 21). Specifically, the temporary rotational axis 2212 is positioned or formed above and forward of the hinge pin axis 2214. The hook 2210 has a hook upper surface 2210a that has an arcuate surface 2216 to receive the second guide 2116 (FIG. 21). The arcuate surface 2216 leads to a flat surface 2218, a raised surface 2220 and a transition surface 2222 that transitions the hook upper surface 2210a and the support surface 2202. As described below, the flat surface 2218 of the illustrated example has an orientation such that the TR connector 2122 does not bind if the thrust reverser portion 2110 rotates about the hinge pin axis 2214.

Figure 23:
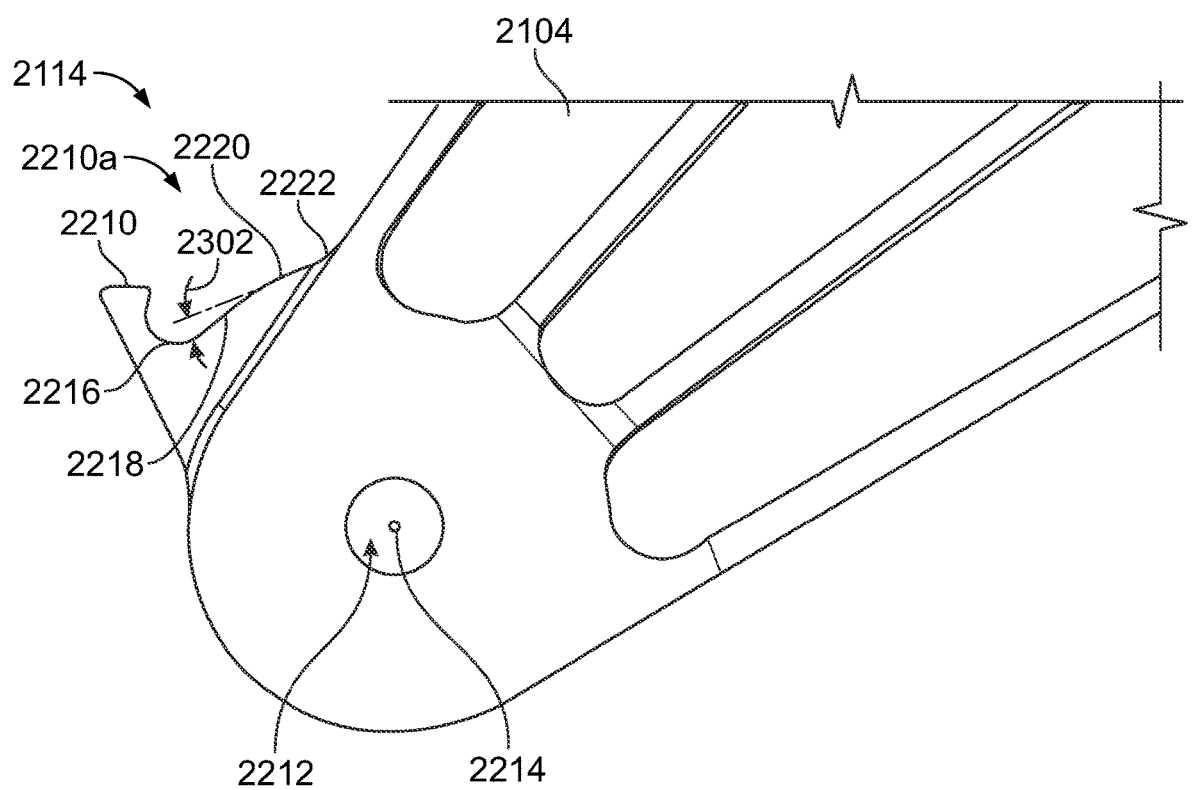
FIG. 23 is a side view of the example first guide of the example guide system of FIG. 22.

FIG. 23 is a partial, side view of the first guide 2114 of FIG. 22. Referring to FIGS. 22 and 23, the flat surface 2218 of the hook upper surface 2210a of the illustrated example has a positive draft angle 2302. For example, the positive draft angle 2302 provided by the flat surface 2218 has a shallower angle than a tangential angle of a rotational path of the thrust reverser portion 2110 (FIG. 21) when rotated about the hinge pin axis 2214 of the hinge pin opening 2112. In this manner, if the second guide 2116 remains coupled to the thrust reverser portion 2110 (FIG. 21) after installation of the thrust reverser portion 2110 and a hinge pin (e.g., the hinge pin 1500) in the hinge pin opening 2112, the second guide 2116 will not interfere with a rotational or pivotal movement of the thrust reverser portion 2110 relative to the pylon 2106 when the thrust reverser portion 2110 is rotated about the hinge pin axis 2214. Thus, the draft angle 2302 of the flat surface 2218 is provided to prevent the second guide 2116 from binding the thrust reverser portion 2110 when the thrust reverser portion 2110 rotates about the hinge pin axis 2214 and the second guide 2116 is coupled to the first guide 2114 (e.g., the hook 2210).

Figure 24:
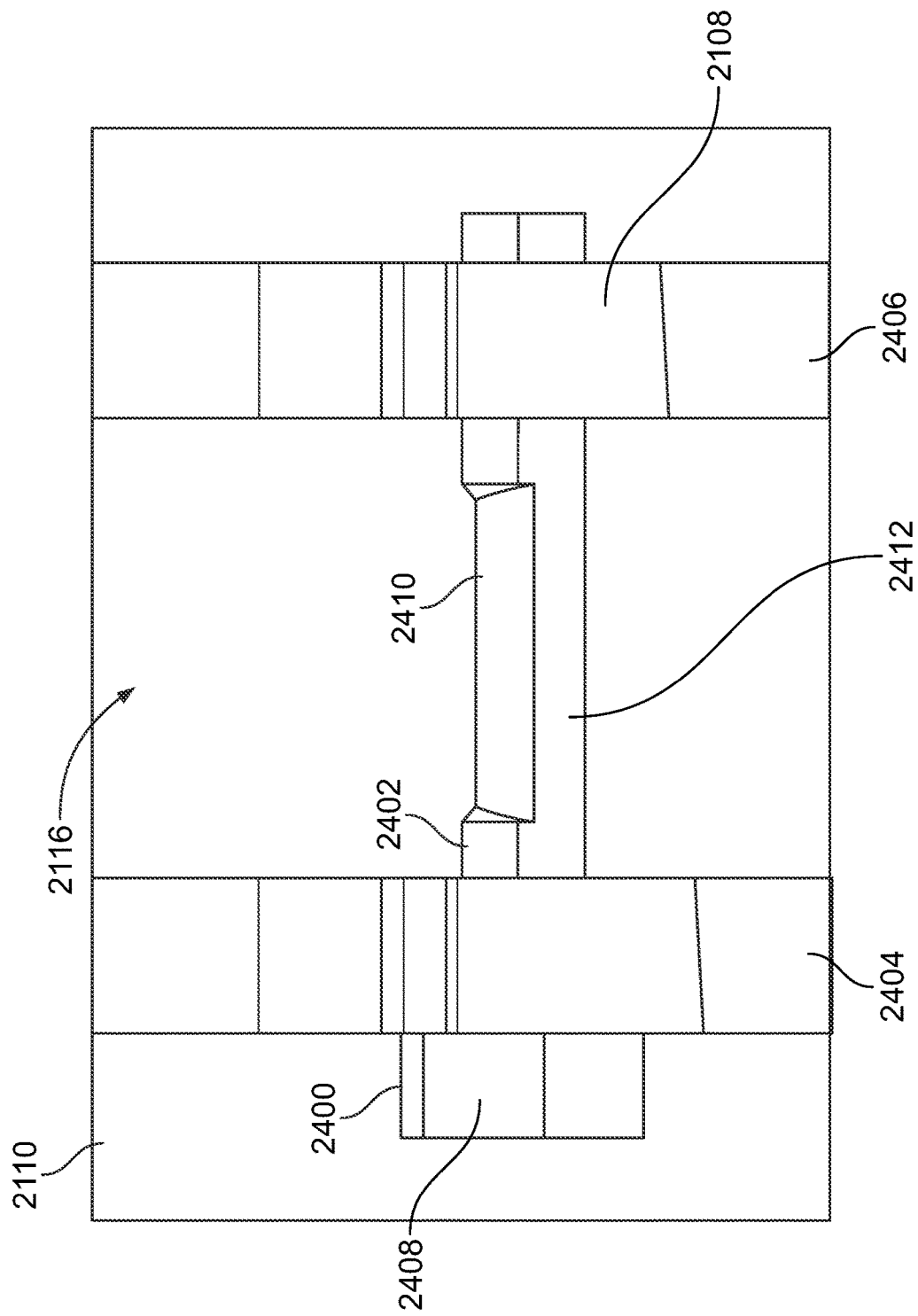
FIG. 24 is a front view of an example second guide of the example guide system of FIG. 21.

FIG. 24 is a front view of the second guide 2116 coupled to the second hinge component 2108 of the thrust reverser portion 2110 of FIG. 21. The second guide 2116 of the illustrated example is a pin 2400 that couples to the second hinge component 2108. The pin 2400 of the illustrated example has a body 2402 that extends between a first side 2404 of the second hinge component 2108 and a second side 2406 of the second hinge component 2108. The pin 2400 includes a head 2408 that engages the first side 2404 of the second hinge component 2108. The pin 2400 is inserted in openings formed in the respective first side 2404 and the second side 2406 of the second hinge component via a clearance fit. As used herein, a clearance fit can enable a pin to fit within an opening via a close clearance such that the pin can be inserted and/or removed from a hinge pin opening relatively easily with minimal force (e.g., without the use of a tool such as a hammer). The pin 2400 of the illustrated example is a camming adjustment pin. For example, the body 2402 includes a recess 2410 and a cam 2412. The cam 2412 provides micro-adjust capability to align the hinge pin opening 2112 when the thrust reverser portion 2110 is in the installed position (e.g., the installed position 1200 of FIG. 12). For example, the pin 2400 can be rotated via the head 2408 about its longitudinal axis to cause the cam 2412 to engage the first guide 2114 (FIG. 21) and cause micro adjustment between the first hinge component 2104 of the pylon 2106 and the second hinge component 2108 of the thrust reverser portion 2110. For example, a technician standing on a platform (e.g., the platform 1400 of FIG. 14) can rotate the pin 2400 by rotating the head 2408 via a tool during installation of a hinge pin in the hinge pin opening 2112 if the hinge pin does not pass through the hinge pin opening 2112. For example, the cam 2412 can allow adjustment between the first hinge component 2104 and the second hinge component 2108 by a distance of between about one-tenth of an inch and one-third of an inch. For example, to move or shift the second hinge component 2108 toward the first hinge component 2104, the pin 2400 can be rotated via the head to orient the recess 2410 towards (e.g., move the recess 2410 into engagement with) the arcuate surface 2216 (FIGS. 21 and 22) of the hook 2210 (FIG. 21). To move or shift the second hinge component 2108 away from the first hinge component 2104, the pin 2400 can be rotated via the head to orient the cam 2412 towards (e.g., move the cam 2412 into engagement with) the arcuate surface 2216 (FIGS. 21 and 22) of the hook 2210 (FIG. 21).

Figure 25:
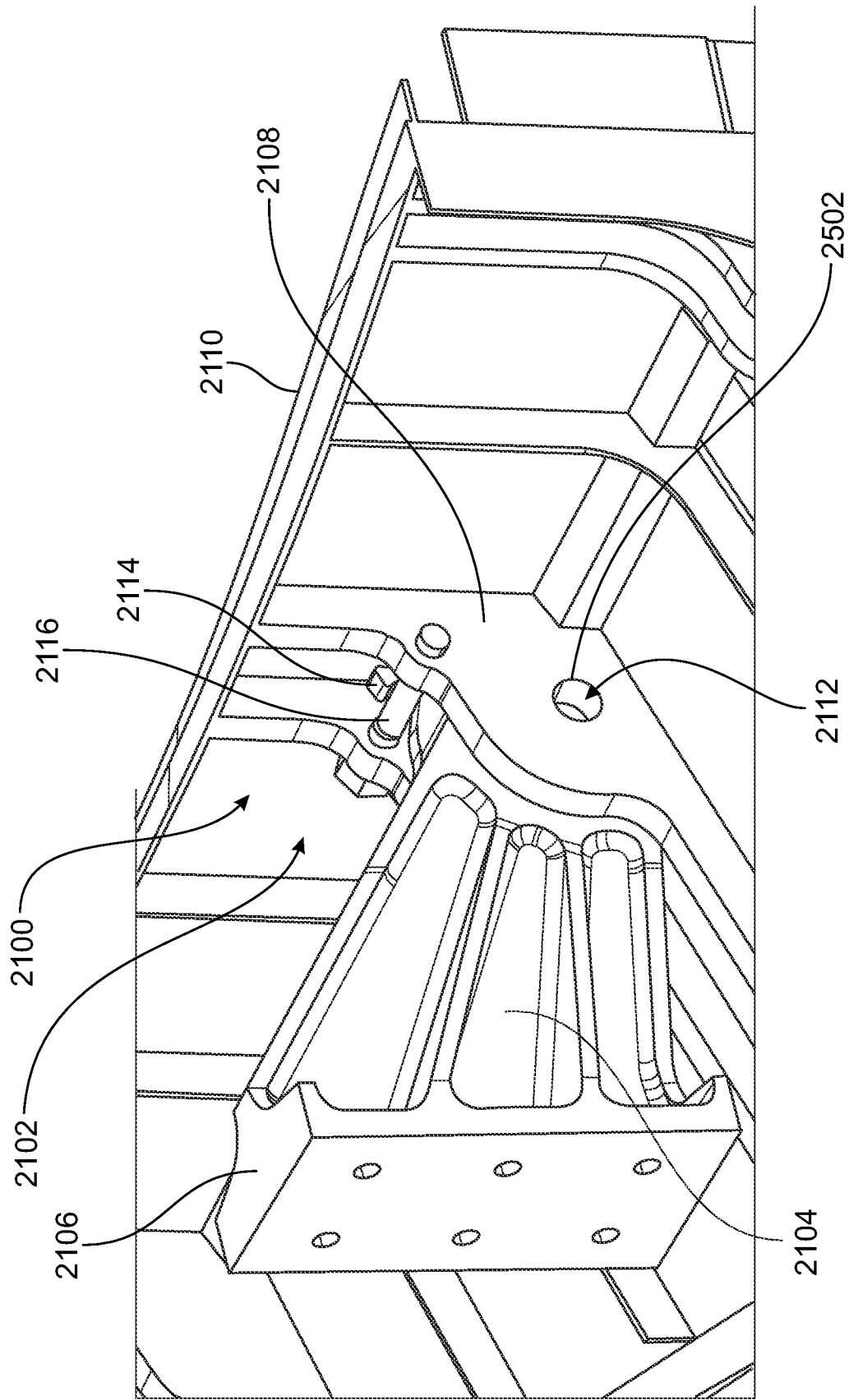
FIG. 25 is another perspective view of the example guide system of FIG. 21.

FIG. 25 is a partial, perspective view of the pylon 2106 and the thrust reverser portion 2110 of FIG. 21 implemented with the guide system 2100. The first guide 2114 interfaces with the second guide 2116 to facilitate installation of the thrust reverser portion 2110 and the pylon 2106 as the thrust reverser portion 2110 moves (e.g., rotates or pivots) from an installation position (e.g., an installation angle or the installation position 1100 of FIG. 11) and an installed position (e.g., an installed angle or the installed position 1200 of FIG. 12). For example, during assembly, a crane is employed to move the thrust reverser portion 2110 toward the pylon 2106 at an installation angle (e.g., the installation position 1100 of FIG. 11) to enable engagement between first guide 2114 and the second guide 2116. Rotation of the thrust reverser portion 2110 enables alignment between the opening 2217 of the first hinge component 2104 and an opening 2502 of the second hinge component 2108 to define the hinge pin opening 2112 when the thrust reverser portion 2110 is moved from an installation position (e.g., the installation position 1100 of FIG. 11) to an installed position (e.g., the installed position 1200 of FIG. 12) relative to the pylon 2106. If the hinge pin (e.g., the hinge pin 1500) is difficult to insert into the hinge pin opening 2112, the second guide 2116 can be rotated to adjust (e.g., coaxially align) the opening 2217 of the first hinge component 2104 relative to the opening 2502 of the second hinge component 2108 to enable insertion of the hinge pin in the hinge pin opening 2112.

Figure 26:
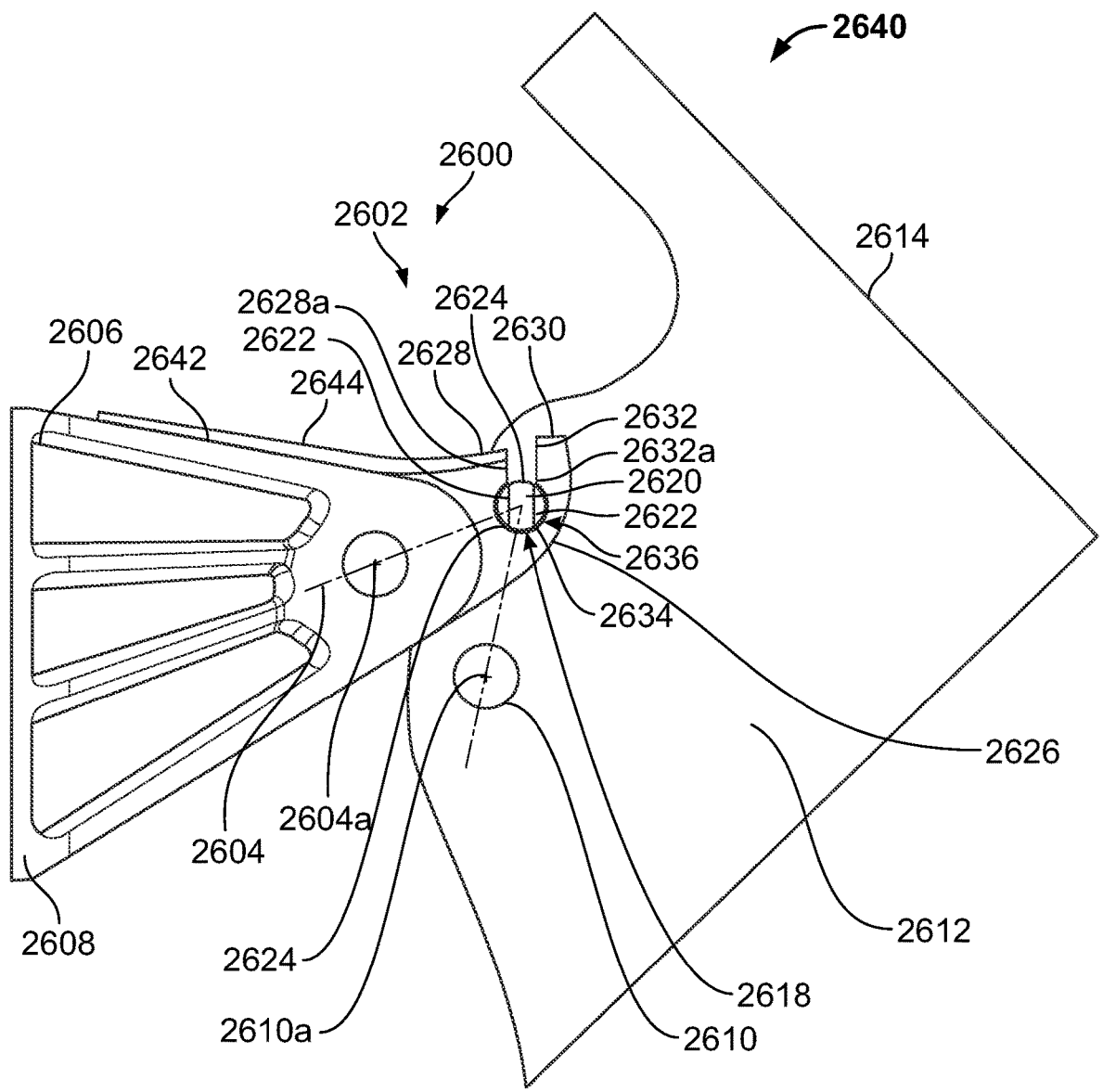
FIG. 26 is a side view of an example pylon and an example thrust reverser portion implemented with another example guide system disclosed herein.

FIG. 26 is a side view of another example guide system 2600 disclosed herein. The guide system 2600 facilitates assembly of a hinge 2602 defined by a hinge opening 2604 of a first hinge component 2606 supported by a pylon 2608 (e.g., a first aircraft structure) and a hinge opening 2610 of a second hinge component 2612 supported by a thrust reverser portion 2614 (e.g., a second aircraft structure). The guide system 2600 facilitates alignment (e.g., coaxial alignment) of the hinge openings 2604 and 2610 when the thrust reverser portion 2614 is coupled to the pylon 2608. The guide system 2600 includes an actively retained guide pin. For example, the guide system 2600 of the illustrated example includes a first guide 2616 (e.g., a pylon connector) and a second guide 2618 (e.g., a TR connector).

The second guide 2618 is a pin 2620 that includes side walls 2622 having flat or planar shapes and ends 2624 having arcuate or circular shapes. In other words, the pin 2620 provides a keyed geometry to function as a key. The second guide 2618 is coupled to the second hinge component 2612. In this example, the second guide 2618 is removably coupled to the thrust reverser portion 2614. However, in some examples, the second guide 2618 is integral (e.g., integrally formed) with the second hinge component 2612.

The first guide 2616 includes a body 2626 (e.g., a hook or retainer) that protrudes from the first hinge component 2606. The body 2626 defines a first upper surface 2628 and a second upper surface 2630 separated by a slot 2632 that extends to an opening 2634. The opening 2634 is non-perpendicular (e.g., has an axis that is substantially or exactly parallel) relative to an axis 2604a of the hinge opening 2604 and an axis 2610a of the hinge opening 2610. The slot 2632 enables access to the opening 2634 via the first upper surface 2628 and the second upper surface 2630. The slot 2632 is defined by a first side wall 2628a (e.g., a vertical wall) adjoining the first upper surface 2628 and a second side wall 2630a (e.g., a vertical wall) adjoining the second upper surface 2630. The first side wall 2628a is parallel relative to the second side wall 2630a and defines the slot 2632. For example, the first side wall 2628a is substantially perpendicular to the first upper surface 2628 and the second side wall 2630a is substantially perpendicular to the second upper surface 2630. The first guide 2616 is integral with (e.g., integrally formed with) the first hinge component 2606. Thus, the first guide 2616 is not removed or decoupled from the respective first hinge component 2606 after installation of the thrust reverser portion 2614 and the pylon 2608.

The slot 2632 and the opening 2634 provided a keyed aperture 2636 configured to receive the second guide 2618. For example, the slot 2632 can receive the pin 2620 when the thrust reverser portion 2614 is in an installation position 2640 (e.g., an installation angle) shown in FIG. 26. In the installation position 2640, the side walls 2622 of the pin 2620 orient toward (e.g., are parallel relative to) the respective first side wall 2628a and the second side wall 2630a. Thus, the pin 2620 can only couple and/or decouple from the keyed aperture 2636 when the thrust reverser portion 2614 is in the installation position 2640.

Additionally, the first upper surface 2628 is offset from the second upper surface 2630. For example, the second upper surface 2630 is at a higher elevation than the first upper surface 2628. In this manner, the second side wall 2632 can stop or guide the second guide 2618 (e.g., the pin 2620) and align the second guide 2618 relative to the slot 2632 when the second guide 2618 moves along a support surface 2642 of the first hinge component 2606 and toward the slot 2632 when moving the thrust reverser portion 2614 to the installation position 2640. For example, the support surface 2642 transitions to the slot 2632 via the first upper surface 2628. To protect the support surface 2642 from damage when the second guide 2618 moves (e.g., slides) along the support surface 2642, the guide system 2600 includes a protective layer 2644 (e.g., a rub surface, a protective barrier). The protective layer 2644 can be a sacrificial material or coating that couples to the support surface 2642. For example, the protective layer 2644 can be a Teflon tape, rubber, a plastic block, and/or any other sacrificial material(s). In some examples, the keyed aperture 2636 can have any other keyed shape.

Figure 27:
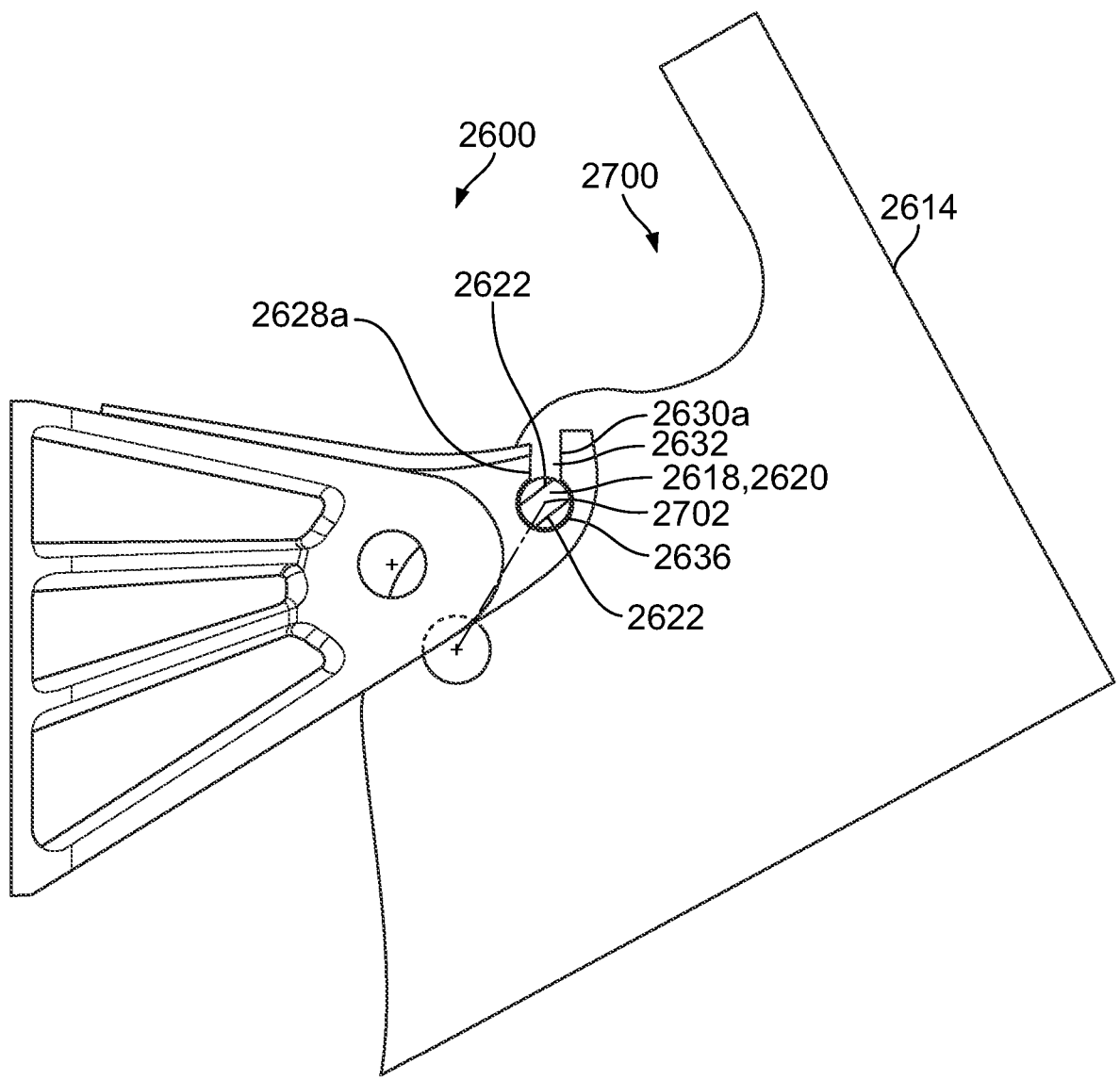
FIG. 27 is a side view of the example guide system of FIG. 26 showing the example thrust reverser portion in an example intermediate position.

FIG. 27 is a side view the guide system 2600 of FIG. 26 shown in an intermediate position 2700. After the second guide 2618 is coupled to the keyed aperture 2636, the thrust reverser portion 2614 can rotate about an axis 2702 defined by the keyed aperture 2636. Additionally, when the thrust reverser portion 2614 is rotated to a non-installation position, the keyed aperture 2636 prevents the thrust reverser portion 2614 from decoupling from the pylon 2608. For example, in the intermediate position 2700 of FIG. 27, the side walls 2622 of the pin 2620 are at a non-parallel orientation relative to the first side wall 2628a and the second side wall 2630a defining the slot 2632. Thus, the slot 2632 is not sufficiently sized to allow the pin 2620 to pass through the slot 2632 when the side walls 2622 of the pin 2620 are not parallel relative to the first side wall 2628a and the second side wall 2630a.

Figure 28:
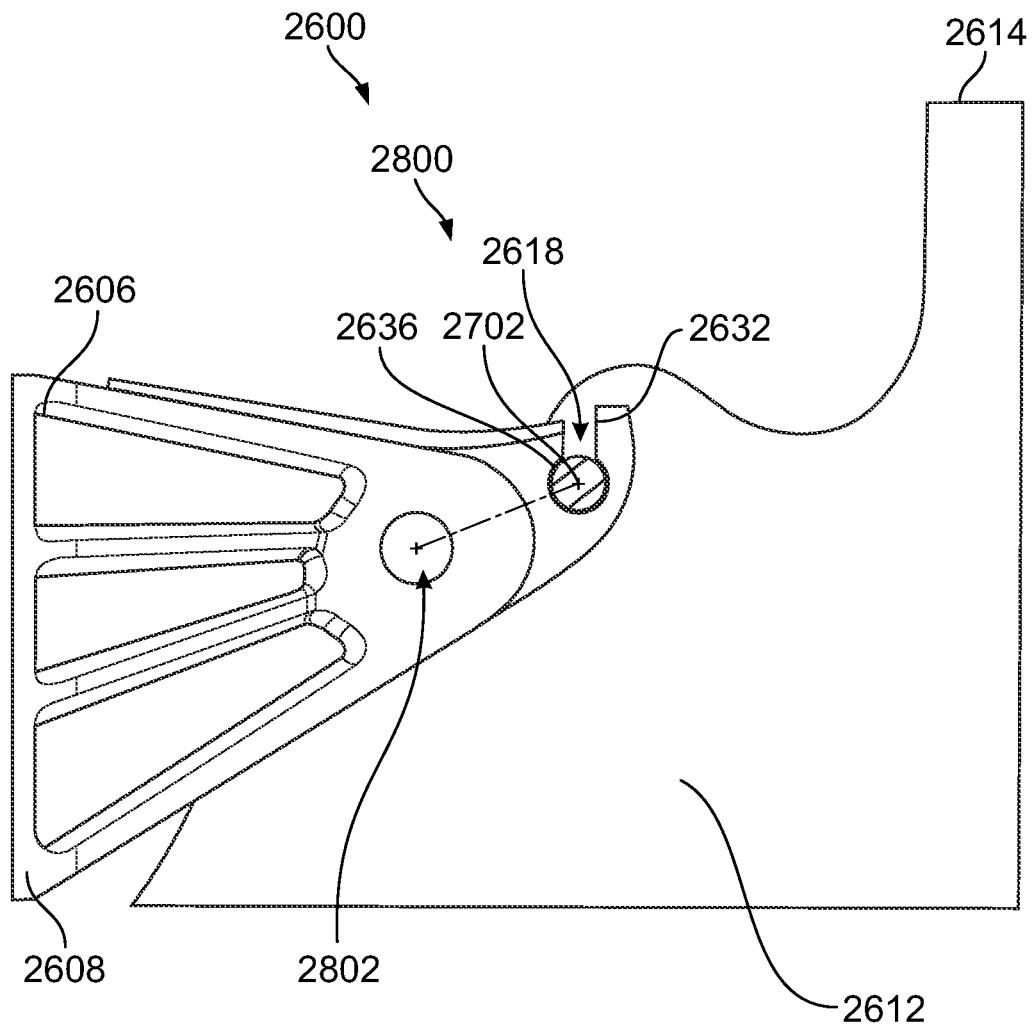
FIG. 28 is a side view of the example guide system of FIG. 26 showing the example thrust reverser portion in an example installed position.

FIG. 28 is a side view the guide system 2600 of FIG. 26 shown in an installed position 2800. In the installed position 2800, the hinge opening 2610 (FIG. 26) of the second hinge component 2612 aligns (e.g., coaxially aligns) with the hinge opening 2604 (FIG. 26) of the first hinge component 2606 to define a hinge opening 2802 to receive a hinge pin (e.g., the hinge pin 1500 of FIG. 15) to couple (e.g., pivotally couple) the thrust reverser portion 2614 and the pylon 2608. Additionally, the second guide 2618 is decoupled from or removed from the first guide 2616 after the hinge pin is installed in the hinge opening 2802. For example, the pin 2620 can remove from the opening 2634 in a direction parallel to the axis 2702 because the keyed aperture 2636 prevents removal of the pin 2620 from the slot 2632 when the thrust reverser portion 2614 is in the installed position 2800. However, in some examples, the pin 2620 is not removed from the thrust reverser portion 2614.

Figure 29:
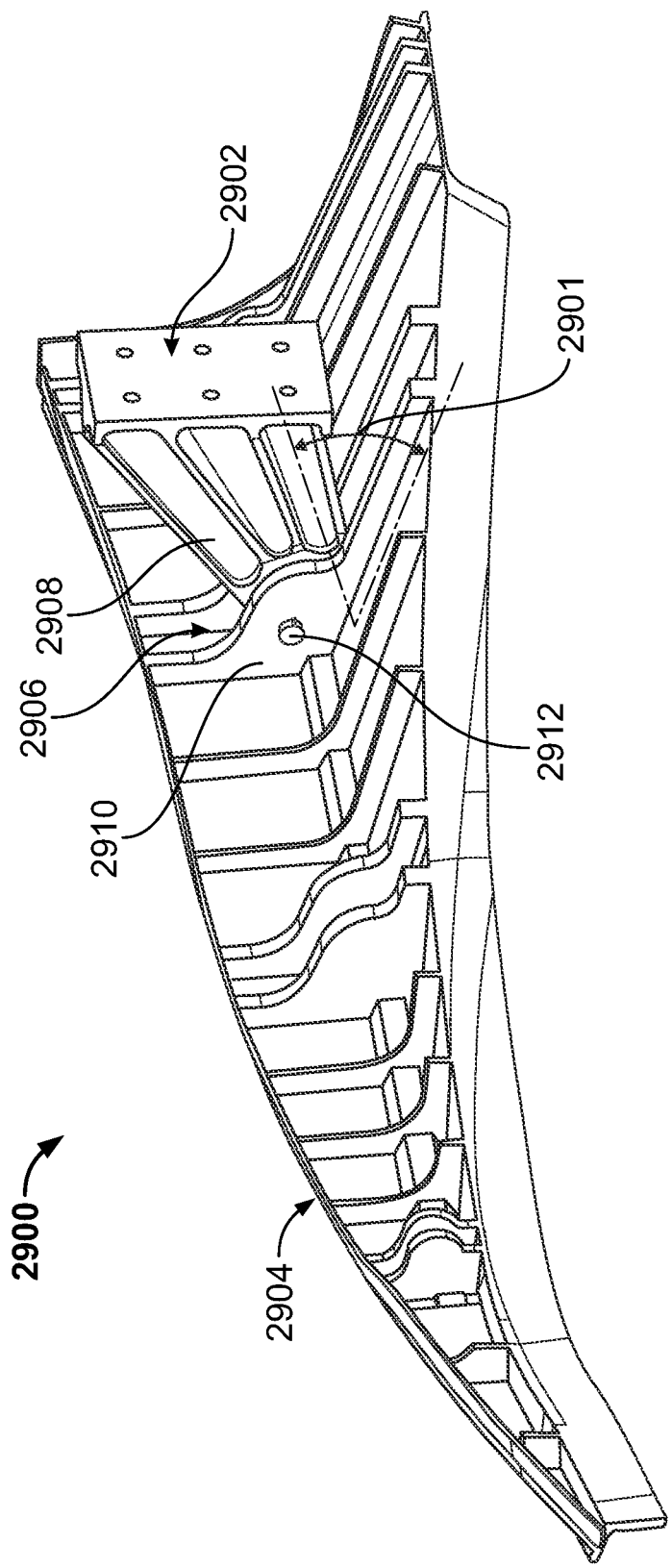
FIG. 29 is a perspective view of another example thrust reverser portion and example pylon defining an example joint disclosed herein.

FIG. 29 is a perspective view of another example system 2900 disclosed herein to couple an example pylon 2902 and an example thrust reverser portion 2904. The thrust reverser portion 2904 of FIG. 29 is shown in an installed position 2901 relative to the pylon 2902 (e.g., an installed angle 2903). In the installed position 2901, the thrust reverser portion 2904 is coupled to the pylon 2902. The pylon 2902 and the thrust reverser portion 2904 form a hinge 2906 (e.g., a hinge joint, a guide system, etc.). As described below, the hinge 2906 is a keyed hinge defining a guide system for installing the thrust reverser portion 2904 and the pylon 2902. The hinge 2906 is defined by a first hinge component 2908 of the pylon 2902, a second hinge component 2910 of the thrust reverser portion 2904, and a hinge pin 2912 that couples (e.g., pivotally couples) the first hinge component 2908 and the second hinge component 2910. To form the hinge 2906, the first hinge component 2908 of the pylon 2902 of the illustrated example is received by the second hinge component 2910 of the thrust reverser portion 1904. For example, the first hinge component 2908 is a lug and the second hinge component 2910 is a clevis. In other examples, the first hinge component 2908 can be a clevis and the second hinge component 2910 can be lug. Although a single hinge is shown in FIG. 29, the thrust reverser portion and the pylon can include more than one hinge (e.g., two hinges, four hinges, etc.).

Figure 30:
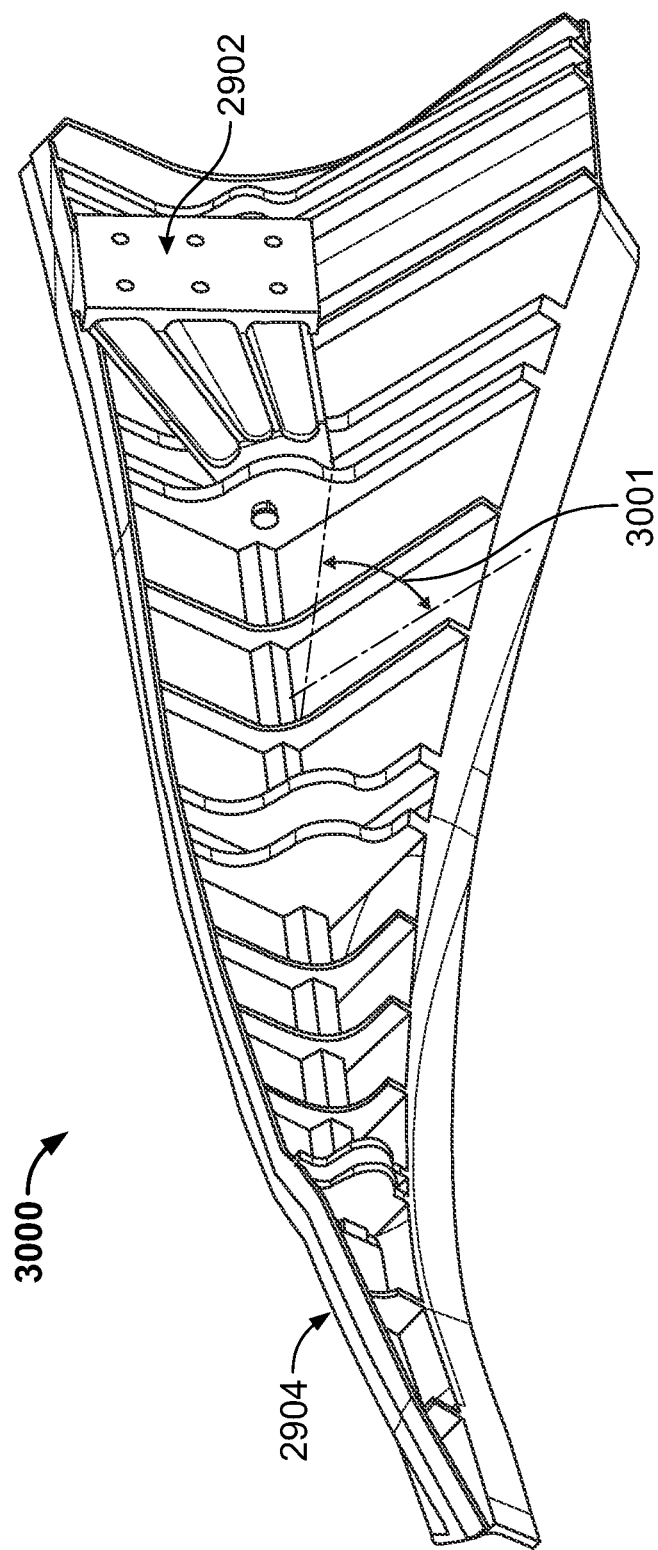
FIG. 30 is a perspective view of the example thrust reverser portion and the example pylon of FIG. 29 shown in an example installation position.

FIG. 30 is a perspective view of the example pylon 2902 and the example thrust reverser portion 2904 of FIG. 29 with the thrust reverser portion of FIG. 29 in an installation position 3000 relative to the pylon 2902 (e.g., an installation angle 3001). As described below, the installation position 3000 enables the thrust reverser portion 2904 to couple to the pylon 2902.

Figure 31:
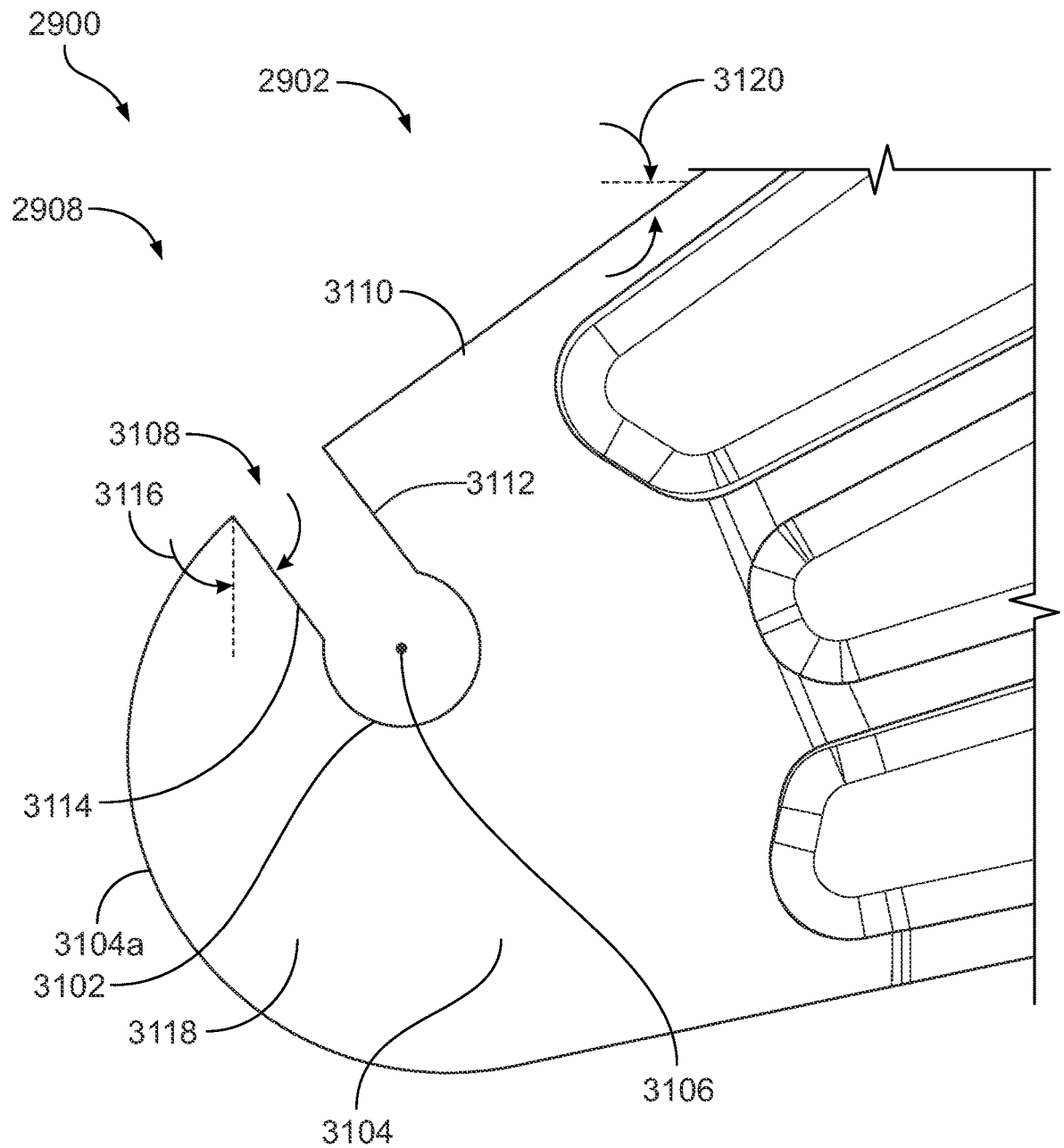
FIG. 31 is a partial side view of an example first hinge component of the example hinge of FIG. 29.

FIG. 31 is a partial side view of the first hinge component 2908 of FIG. 30. The first hinge component 2908 includes an opening 3102 that receives the hinge pin 2912 of FIG. 29. The opening 3102 is formed through a body 3104 (e.g., a tip 3104a) of the first hinge component 2908 and defines a rotational axis 3106 about which the thrust reverser portion 2904 (FIG. 29) rotates relative to the pylon 2902 between the installation position 3000 and the installed position 2901. The first hinge component 2908 includes a slot 3108 to allow access to the opening 3102 from an upper surface 3110 of the first hinge component 2908. The slot 3108 is defined by a first wall 3112 and a second wall 3114 opposing the first wall 3112. The first wall 3112 is parallel relative to the second wall 3114. Each of the first wall 3112 and the second wall 3114 is tapered or angled at an angle 3116 relative to vertical to facilitate access to the opening 3102. Thus, the body 3104, the slot 3108 and the opening 3102 form or define a hook or hook-like end 3118 of the first hinge component 2908. The first wall 3112 is non-parallel relative to the upper surface 3110. For example, the first wall 3112 is substantially perpendicular relative to the upper surface 3110 of the first hinge component 2908. The upper surface 3110 of the illustrated example is tapered or angled and provides a lead-in toward the slot 3108. For example, the upper surface 3110 is formed an angle 3120 relative to horizontal. In some examples, the upper surface 3110 can include a protective layer or barrier to protect the upper surface 3110 from damage when the hinge pin 2912 (FIG. 29) moves (e.g., slides) along the upper surface 3110.

Figure 32:
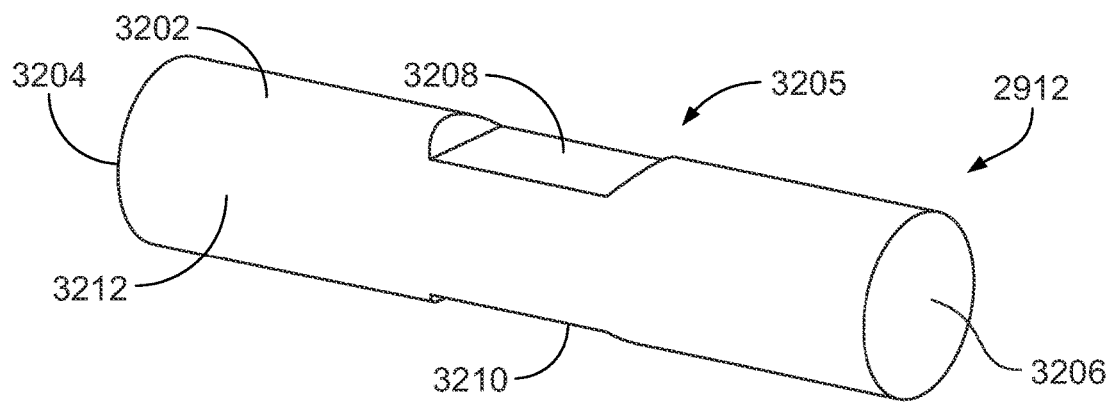
FIG. 32 is a perspective view of an example hinge pin of the example hinge of FIG. 29.

FIG. 32 is a perspective view of the hinge pin 2912 of FIG. 29. The hinge pin 2912 includes a cylindrical body 3202 having a first end 3204 and a second end 3206 opposite the first end 3204. The hinge pin 2912 includes a keyed feature 3205 positioned between the first end 3204 and the second end 3206. Specifically, the keyed feature 3205 of the illustrated example is defined by a first flat surface 3208 and a second flat surface 3210 opposite the first flat surface. 3208. The first flat surface 3208 and the second flat surface 3210 can be formed via recess (e.g., using machining manufacturing processes). For example, the first flat surface 3208 and the second flat surface 3210 are formed on an outer surface 3212 of the cylindrical body 3202.

Figure 33:
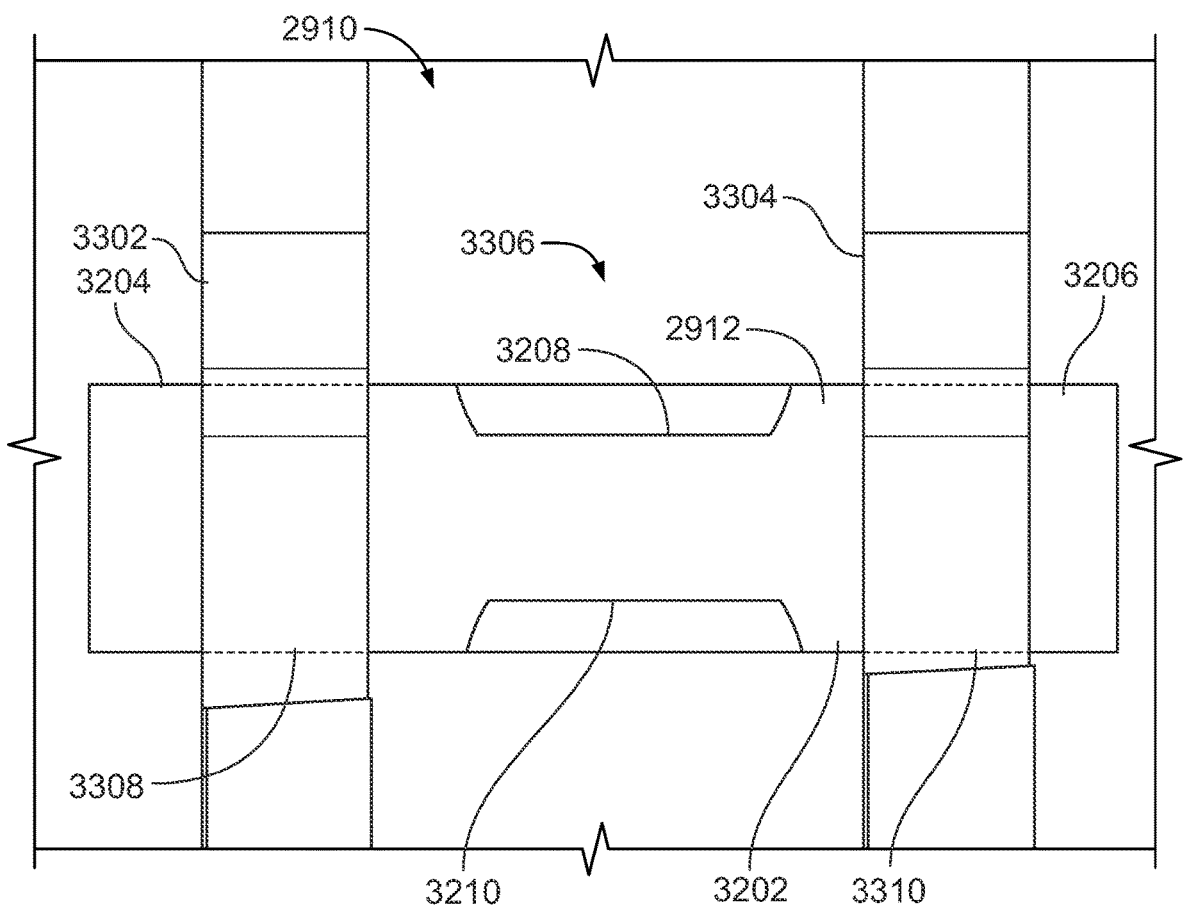
FIG. 33 is a partial front view of an example second hinge component and the example hinge pin of the example hinge of FIG. 29.

FIG. 33 is a front view of the second hinge component 2910 of FIG. 29. The hinge pin 2912 couples to the second hinge component 2910. The second hinge component 2910 of the illustrated example has a first side wall 3302 and a second side wall 3304 spaced from the first side wall 3302 that defines a cavity 3306 to receive the first hinge component 2908 (e.g., the tip 3104a of FIG. 31). The first side wall 3302 includes a first aperture 3308 and the second side wall 3304 includes a second aperture 3310. The first aperture 3308 and the second aperture 3310 receive the hinge pin 2912. For example, the hinge pin 2912 of the illustrated example extends between the first side wall 3302 and the second side wall 3304 of the second hinge component 2910. Specifically, the keyed feature 3205 of the hinge pin 2912 is positioned between the first side wall 3302 and the second side wall 3304. The hinge pin 2912 is rotatably fixed relative to the first aperture 3308 and the second aperture 3310. For example, the hinge pin 2912 can be coupled to the first and second apertures 3308 and 3310 via an interference fit. In some examples, the hinge pin 2912 can be composed of a high strength steel and the second hinge component 2910 can be composed of aluminum. In some examples, the hinge pin 2912 and the second hinge component 2910 can be composed of other materials and/or can be composed of the same materials. In some examples, the hinge pin 2912 can be integrally formed with the second hinge component 2910 as a unitary structure.

Figure 34A:
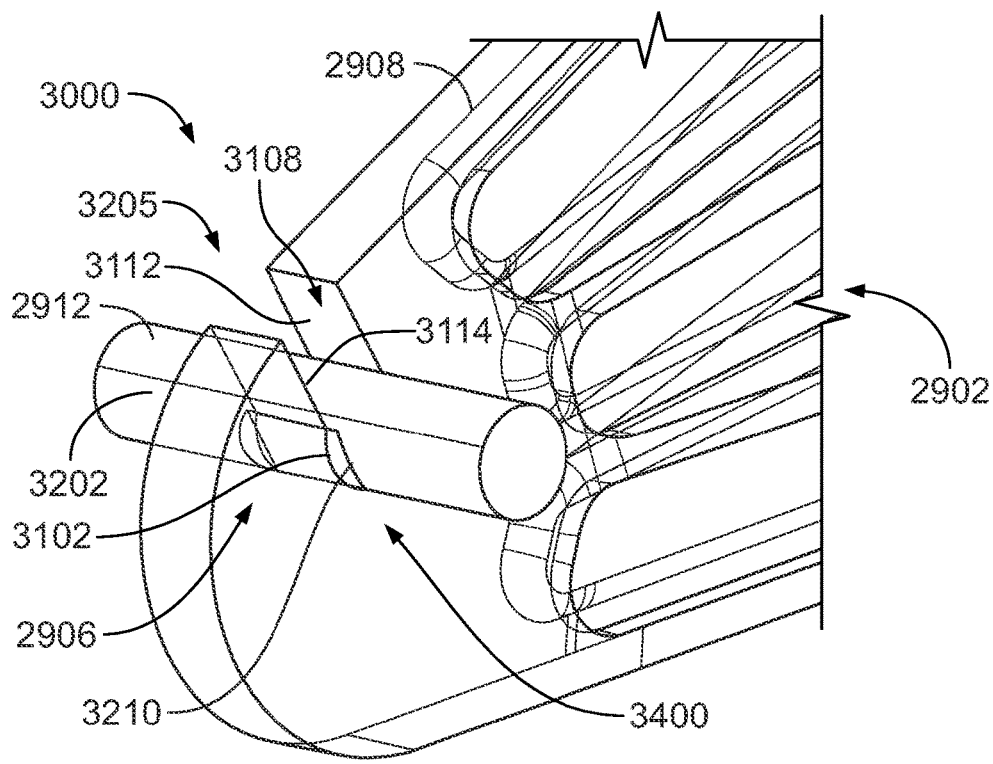
FIG. 34A is a partial perspective view of the example hinge of FIG. 29 shown in the example installation position.
Figure 34B:
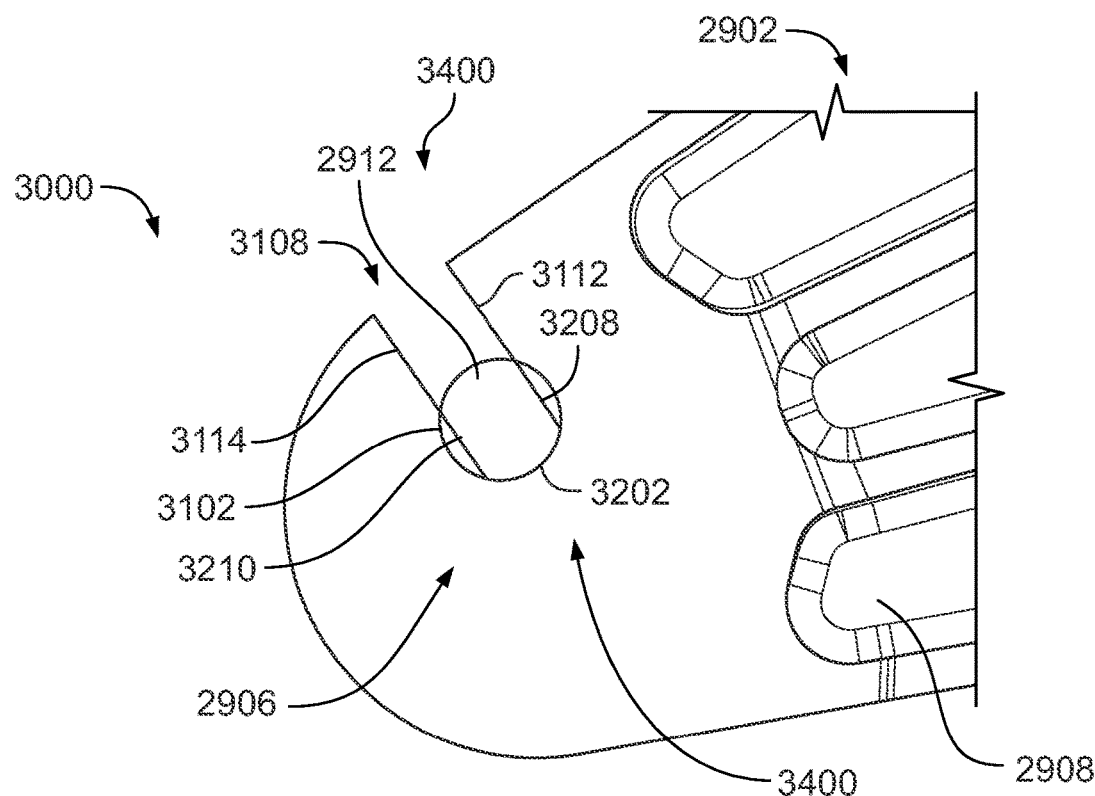
FIG. 34B is a side view of FIG. 34A.

FIG. 34A is a perspective view of the hinge pin 2912 inserted in the opening 3102 of the first hinge component 2908 when the thrust reverser portion 2904 is in the installation position 3000. FIG. 34B is a side view of FIG. 34A. The second hinge component 2910 and/or the thrust reverser portion 2904 is omitted from FIGS. 34A and 34B for clarity. However, the hinge pin 2912 is coupled to the second hinge component 2910 prior to coupling to the first hinge component 2908. Thus, for example, the hinge pin 2912 is installed with the second hinge component 2910 prior to the thrust reverser portion 2904 being moved to the installation position 3000 shown in FIGS. 30, 34A and 34B.

The hinge 2906 (e.g., a hinge joint) forms a keyed connection 3400. Specifically, the keyed connection 3400 allows the hinge pin 2912 to couple to the first hinge component 2908 only when the thrust reverser portion 2904 is in the installation position 3000 of FIGS. 30, 34A and 34B. In other words, the hinge pin 2912 can couple to the opening 3102 of the first hinge component 2908 when the hinge pin 2912 in is a specific orientation (e.g., a key orientation). For example, to enable coupling to the opening 3102, the hinge pin 2912 has to pass through the slot 3108. The hinge pin 2912 can only pass through the slot 3108 when the first flat surface 3208 and the second flat surface 3210 are oriented relative to the first wall 3112 and the second wall 3114. For example, the hinge pin 2912 can couple to the keyed connection 3400 when the first flat surface 3208 and the second flat surface 3210 are parallel relative to the first wall 3112 and the second wall 3114 defining the slot 3108. In the illustrated example, the hinge pin 2912 is positioned or coupled to the second hinge component 2910 in an orientation that enables the first flat surface 3208 and the second flat surface 3210 of the hinge pin 2912 to be parallel relative to the first wall 3112 and the second wall 3114 of the first hinge component 2908 when the thrust reverser portion 2904 is oriented in the installation angle 3001 relative to the pylon 2902. In other words, the hinge pin 2912 can couple to the keyed connection 3400 when the thrust reverser portion 2904 is in the installation position 3000 of FIG. 30.

Figure 35A:
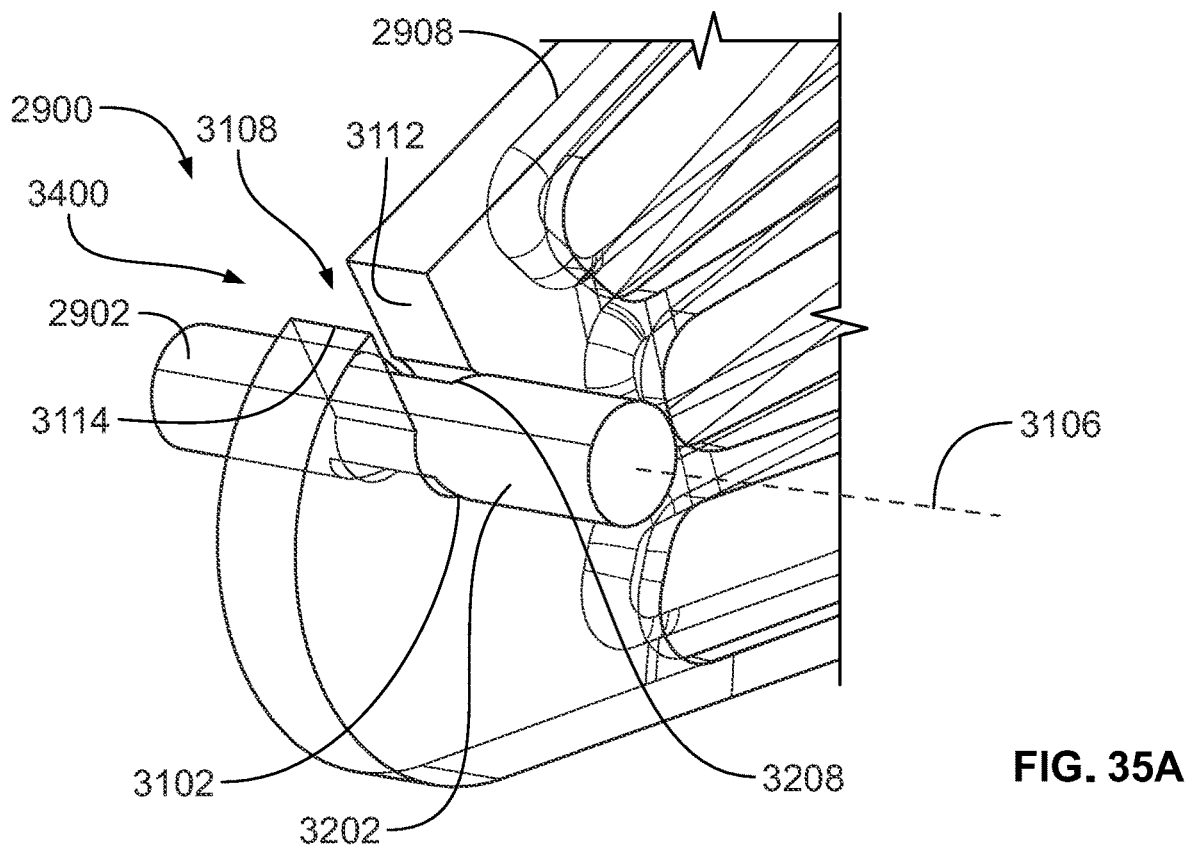
FIG. 35A is a partial perspective view of the example hinge of FIG. 29 shown in an example installed position.
Figure 35B:
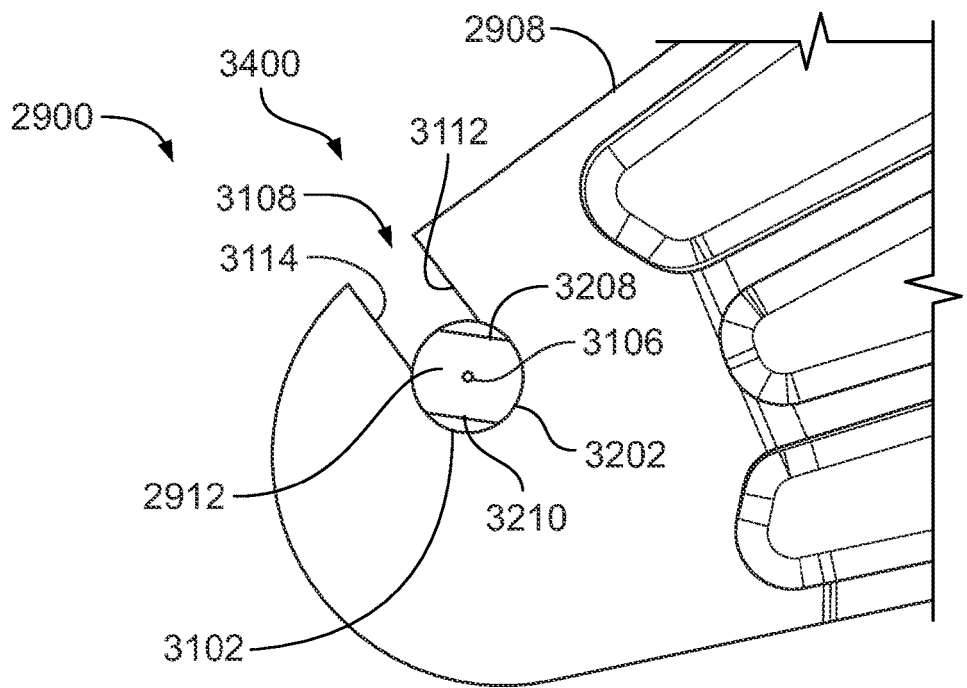
FIG. 35B is a side view of FIG. 35A.

FIG. 35A is a perspective view of the hinge pin 2912 inserted in the opening 3102 of the first hinge component 2908 when the thrust reverser portion 2904 is in the installed position 2901. FIG. 35B is a side view of FIG. 35A. The second hinge component 2910 and/or the thrust reverser portion 2904 is omitted from FIGS. 34A and 34B for clarity. After the hinge pin 2912 is coupled to the opening 3102 and the slot 3108 forming the keyed connection 3400, the thrust reverser portion 2904 is rotated about the rotational axis 3106. For example, the thrust reverser portion 2904 is rotated relative to the pylon 2902 about the rotational axis 3106 from the installation position 3000 to the installed position 2901. In the installed position 2901, the keyed connection 3400 prevents the hinge pin 2912 from removing from the opening 3102 via the slot 3108. However, the opening 3102 is sized and/or shaped to allow the cylindrical body 3202 of the hinge pin 2912 to rotate about the opening 3102.

Thus, when the thrust reverser portion 2904 is rotated to angular position other than the installation position 3000 (e.g., a non-installation position), the keyed connection 3400 of the hinge 2906 prevents the thrust reverser portion 2904 from decoupling from the pylon 2902. For example, in the installed position 2901, the first flat surface 3208 and the second flat surface 3210 are positioned in an orientation non-parallel to the first wall 3112 and the second wall 3114 defining the slot 3108. Thus, the slot 3108 is not sufficiently sized or shaped (e.g., dimensioned) to allow the cylindrical body 3202 of the pin 2620 to pass through the slot 3108 when the first flat surface 3208 and the second flat surface 3210 are not aligned (e.g., are not parallel) relative to the first wall 3112 and the second wall 3114 defining the slot 3108, thereby retaining the thrust reverser portion 2904 and the pylon 2902 in a locked or secured configuration (e.g., provided by the hinge 2906). The hinge 2906 allows the thrust reverser portion 2904 to pivot relative to the pylon 2902 about the rotational axis 3106 in a direction from the installed position 2901 toward the installation position 3000 to perform maintenance and/or activate the thrust reverser of the aircraft during operation. In some examples, the keyed connection 3400 (e.g., a keyed feature) can have any other keyed shape.

The foregoing examples of the guide systems and/or hinge configurations can be employed with an aircraft and/or aircraft engine. Although each example guide systems and/or hinge configurations disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

At least some of the aforementioned examples include one or more features and/or benefits including, but not limited to, the following:

In some examples, an apparatus includes a first guide structured to be supported by a first hinge component of a first aircraft structure and a second guide structured to be supported by a second hinge component of a second aircraft structure. The first guide is to receive the second guide when the second structure is at an installation angle relative to the first structure. Engagement between the first guide and the second guide to enable rotational movement of the first hinge component and the second hinge component when the second aircraft structure moves to an installed position.

In some examples, the first aircraft structure is a pylon and the second aircraft structure is a thrust reverser section.

In some examples, the first guide and the second guide prevent lateral movement of the first hinge component relative to the second hinge component when the second aircraft structure moves from the installation position to an installed position.

In some examples, the first guide is removably coupled to the first hinge component or the second guide is removably coupled to the second hinge component.

In some examples, the first guide is integrally formed with the first hinge component or the second guide is integrally formed with the second hinge component.

In some examples, the first guide includes a hook and the second guide includes a pin.

In some examples, an apparatus includes a first aircraft structure, a first hinge component formed by the first aircraft structure and a hook provided on the first hinge component. The apparatus includes a second aircraft structure, a second hinge component formed on the second aircraft structure, and a pin provided on the second hinge component.

In some examples, the hook is to receive the pin when the second aircraft structure is in an installation position.

In some examples, the hook and the pin form an interface to enable the second aircraft structure to pivot to an installed angle relative to the first aircraft structure.

In some examples, the first hinge component includes a first hinge opening and the second hinge component includes a second hinge opening, the interface provided by the hook and the pin is to enable the first hinge opening to align with the second hinge opening when the second aircraft structure pivots relative to the first aircraft structure between the installation position and the installed position.

In some examples, the hook includes a base and an adjustor, the adjustor to move a position of the hook relative to the first hinge component between a first position and a second position.

In some examples, the pin includes a camming surface to enable adjustment of the first hinge opening relative to the second hinge opening.

In some examples, the hook is removed from the first hinge component when the second aircraft structure is in an installed position.

In some examples, the hook is integrally formed with the first hinge component and positioned adjacent a first hinge opening of the first hinge component.

In some examples, the hook and the pin form a keyed connection that enables the pin to couple to the hook when the second aircraft structure is in an installation position and prevents the pin from decoupling from the hook when the second aircraft structure is in an installed position.

In some examples, the pin includes a cammed surface to enable adjustment of the second hinge component relative to the first hinge component after the second aircraft structure is coupled to the first aircraft structure.

In some examples, the pin is integrally formed with the second hinge component and positioned adjacent a second hinge opening of the second hinge component.

In some examples, the hook and pin stabilize the second aircraft structure and allow only rotational movement of the first hinge component relative to the second hinge component when the second aircraft structure pivots relative to the first aircraft structure between an installation position and an installed position.

In some examples, the hook includes a protective layer of material positioned on a rub surface of the hook.

In some examples, an example method includes coupling a first guide to a first hinge component of a first aircraft structure; removably coupling a second guide to a second hinge component of a second aircraft structure; coupling the second guide and the first guide when the second aircraft structure is positioned in an installation angle relative to the first aircraft structure; and rotating the second aircraft structure to an installed position.

In some examples, the method includes inserting a hinge pin through a hinge opening of the first aircraft structure and the second aircraft structure when the second aircraft structure is in the installed position.

In some examples, the method includes removing the first guide from the first aircraft structure and removing the second guide from the second aircraft structure after inserting the hinge pin.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

What is claimed is:

1. An apparatus comprising:
a first hinge component of a first aircraft structure, the first aircraft structure including a pylon;
a first guide structured to be supported by the first hinge component;
a second hinge component of a second aircraft structure, the second aircraft structure including a thrust reverser section; and
a second guide structured to be supported by the second hinge component, the first guide to engage the second guide when the second aircraft structure is at an installation angle relative to the first aircraft structure and the first hinge component is decoupled from the second hinge component, the first guide and the second guide to enable rotational movement between of the first aircraft structure and the second aircraft structure to move the second aircraft structure to an installed position with the first aircraft structure, the first guide to decouple from the second guide when the first hinge component is coupled to the second hinge component.

2. The apparatus of claim 1, wherein the first guide and the second guide prevent lateral movement of the first hinge component relative to the second hinge component when the second aircraft structure moves from the installation angle to the installed position.

3. The apparatus of claim 1, wherein the first guide is removably coupled to the first hinge component or the second guide is removably coupled to the second hinge component.

4. The apparatus of claim 1, wherein the first guide is integrally formed with the first hinge component or the second guide is integrally formed with the second hinge component.

5. The apparatus of claim 1, wherein the first guide includes a hook and the second guide includes a pin.

6. The apparatus of claim 5, wherein the first guide further includes a base and an adjustor, the adjustor to move a position of the hook relative to the first hinge component between a first position and a second position.

7. The apparatus of claim 6, wherein the base couples the hook to the first structure via a mounting fastener.

8. The apparatus of claim 6, wherein the hook is slidably coupled to the base.

9. The apparatus of claim 8, wherein the adjustor includes a slider positioned with a cavity of the base and an adjustor fastener coupled to the slider, rotation of the adjustor fastener to cause the slider to move within the base.

10. The apparatus of claim 9, wherein the slider is fixed to the hook and slidably coupled to the base.

11. The apparatus of claim 1, wherein the first guide includes an adjustor.

12. The apparatus of claim 11, wherein the adjustor is to move a position of the first guide relative to the first hinge component.

13. The apparatus of claim 1, wherein the first guide is a hook coupled to an upper surface of the first hinge component and positioned above a first hinge opening of the first hinge component.

14. The apparatus of claim 1, wherein the second guide is a third hinge component attached to the second aircraft structure, the second guide positioned above a second hinge opening of the second hinge component.

15. An apparatus comprising:
a first aircraft structure;
a first hinge component formed by the first aircraft structure, the first hinge component including a first hinge opening;
a hook attached to the first hinge component and spaced from the first hinge opening;
a second aircraft structure;
a second hinge component formed on the second aircraft structure, the second hinge component includes a second hinge opening;
a third hinge component adjacent the second hinge component, the third hinge component including a third hinge opening spaced from the second hinge opening;
a first pin coupled to the third hinge opening of the third hinge component, the hook configured to couple to the first pin to enable the second aircraft structure to pivot relative to the first aircraft structure to enable the first hinge opening to align with the second hinge opening when the first hinge component is detached from the second hinge component, wherein the hook and the first pin stabilize the second aircraft structure and allow only rotational movement of the first hinge component relative to the second hinge component when the second aircraft structure pivots relative to the first aircraft structure; and
a second pin to pivotally couple to the first hinge component and the second hinge component, the second pin to be received by the first hinge opening and the second hinge opening when the first hinge opening is aligned with the second hinge opening, the hook configured to detach from the first pin when the first hinge component is pivotally coupled to the second hinge component via the second pin.

16. The apparatus of claim 15, wherein the hook is to receive the first pin when the first hinge component is decoupled from the second hinge component.

17. The apparatus of claim 16, wherein an engagement between the hook and the first pin forms an interface to enable the second aircraft structure to pivot relative to the first aircraft structure.

18. The apparatus of claim 15, wherein the hook includes a base and an adjustor, the adjustor to move a position of the hook relative to the first hinge component between a first position and a second position.

19. The apparatus of claim 15, wherein the hook is integrally formed with the first hinge component and positioned adjacent the first hinge opening of the first hinge component.

20. The apparatus of claim 15, wherein the hook includes a protective layer of material positioned on a rub surface of the hook.

\* \* \* \* \*